(12) United States Patent
Schultz et al.

(10) Patent No.: US 8,534,357 B2
(45) Date of Patent: Sep. 17, 2013

(54) WELLBORE LASER OPERATIONS

(75) Inventors: Roger L. Schultz, Ninnekah, OK (US); Loyd E. East, Houston, TX (US); Harold G. Walters, Duncan, OK (US); Billy Wilson McDaniel, Duncan, OK (US); Mohamed Y. Soliman, Cypress, TX (US); Neal Gregory Skinner, Lewisville, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/614,681

(22) Filed: Sep. 13, 2012

(65) Prior Publication Data

US 2013/0008657 A1    Jan. 10, 2013

Related U.S. Application Data

(63) Continuation of application No. 12/825,906, filed on Jun. 29, 2010, now Pat. No. 8,464,794.

(60) Provisional application No. 61/221,418, filed on Jun. 29, 2009.

(51) Int. Cl.
*E21B 43/11* (2006.01)
(52) U.S. Cl.
USPC ............. 166/297; 166/250.1; 175/11; 175/15
(58) Field of Classification Search
USPC ........................ 166/297, 250.1; 175/11, 15
See application file for complete search history.

(56) References Cited

U.S. PATENT DOCUMENTS

| | | | |
|---|---|---|---|
| 2,363,269 A * | 11/1944 | Schlumberger | ............... 166/288 |
| 3,461,964 A | 8/1969 | Venghiattis | |
| 3,493,060 A | 2/1970 | Van Dyk | |
| 3,572,438 A | 3/1971 | Rohe | |
| 3,693,718 A | 9/1972 | Stout | |
| 3,871,485 A | 3/1975 | Keenan, Jr. | |
| 3,882,945 A | 5/1975 | Keenan, Jr. | |
| 3,960,448 A | 6/1976 | Schmidt et al. | |
| 3,977,478 A | 8/1976 | Shuck | |

(Continued)

FOREIGN PATENT DOCUMENTS

| | | |
|---|---|---|
| EP | 0 950 170 B1 | 9/2002 |
| JP | 09072738 A | 3/1997 |

(Continued)

OTHER PUBLICATIONS

Brian C. Gahan, et al., "Laser Drilling: Determination of Energy Required to Remove Rock," SPE 71466, Society of Petroleum Engineers, copyright 2001, pp. 1-11.

(Continued)

*Primary Examiner* — Jennifer H Gay
(74) *Attorney, Agent, or Firm* — John W. Wustenberg; Fish & Richardson P.C.

(57) ABSTRACT

Systems, methods, and apparatuses involve selecting an aperture geometry to filter solids from fluid from a subterranean zone, the aperture geometry selected based on a distribution of sizes of particles in the fluid from the subterranean zone. A laser can be used to form slots with the selected aperture geometry in a casing installed in a well in the subterranean zone, the aperture geometry having a size selected based on the distribution of sizes of the particles.

14 Claims, 15 Drawing Sheets

(56) References Cited

U.S. PATENT DOCUMENTS

| | | | |
|---|---|---|---|
| 3,992,095 A | 11/1976 | Jacoby et al. | |
| 3,998,281 A | 12/1976 | Salisbury et al. | |
| 4,026,356 A | 5/1977 | Shuck | |
| 4,061,190 A | 12/1977 | Bloomfield | |
| 4,066,138 A | 1/1978 | Salisbury et al. | |
| 4,090,572 A | 5/1978 | Welch | |
| 4,113,036 A | 9/1978 | Stout | |
| 4,189,705 A | 2/1980 | Pitts, Jr. | |
| 4,199,034 A | 4/1980 | Salisbury et al. | |
| 4,227,582 A | 10/1980 | Price | |
| 4,228,856 A | 10/1980 | Reale | |
| 4,266,609 A | 5/1981 | Rom et al. | |
| 4,282,940 A | 8/1981 | Salisbury et al. | |
| 4,370,886 A | 2/1983 | Smith, Jr. et al. | |
| 4,375,164 A | 3/1983 | Dodge et al. | |
| 4,640,355 A | 2/1987 | Hong et al. | |
| 4,860,654 A | 8/1989 | Chawla et al. | |
| 4,860,655 A | 8/1989 | Chawla | |
| 5,010,964 A | 4/1991 | Cornette | |
| 5,049,738 A | 9/1991 | Gergely et al. | |
| 5,084,617 A | 1/1992 | Gergely | |
| 5,107,936 A | 4/1992 | Foppe | |
| 5,163,321 A | 11/1992 | Perales | |
| 5,172,112 A | 12/1992 | Jennings | |
| 5,273,115 A | 12/1993 | Spafford | |
| 5,318,123 A * | 6/1994 | Venditto et al. | 166/250.1 |
| 5,360,066 A * | 11/1994 | Venditto et al. | 166/250.1 |
| 5,386,875 A | 2/1995 | Venditto et al. | |
| 5,396,805 A | 3/1995 | Surjaatmadja | |
| 5,413,045 A | 5/1995 | Miszewski | |
| 5,479,860 A | 1/1996 | Ellis | |
| 5,561,516 A | 10/1996 | Noble et al. | |
| 5,757,484 A | 5/1998 | Miles et al. | |
| 5,847,825 A | 12/1998 | Alexander | |
| 5,862,273 A | 1/1999 | Pelletier | |
| 5,929,986 A | 7/1999 | Slater et al. | |
| 5,986,756 A | 11/1999 | Slater et al. | |
| 6,012,526 A | 1/2000 | Jennings et al. | |
| 6,038,363 A | 3/2000 | Slater et al. | |
| 6,065,543 A | 5/2000 | Gano et al. | |
| 6,073,697 A | 6/2000 | Parlin et al. | |
| 6,147,754 A | 11/2000 | Theriault et al. | |
| 6,166,546 A | 12/2000 | Scheihing et al. | |
| 6,250,391 B1 | 6/2001 | Proudfoot | |
| 6,283,214 B1 | 9/2001 | Guinot et al. | |
| 6,321,839 B1 | 11/2001 | Vereecken et al. | |
| 6,355,928 B1 | 3/2002 | Skinner et al. | |
| 6,384,738 B1 | 5/2002 | Carstensen et al. | |
| 6,437,326 B1 | 8/2002 | Yamate et al. | |
| 6,450,257 B1 | 9/2002 | Douglas | |
| 6,644,848 B1 | 11/2003 | Clayton et al. | |
| 6,710,720 B2 | 3/2004 | Carstensen et al. | |
| 6,747,743 B2 | 6/2004 | Skinner et al. | |
| 6,755,262 B2 | 6/2004 | Parker | |
| 6,847,034 B2 | 1/2005 | Shah et al. | |
| 6,851,488 B2 | 2/2005 | Batarseh | |
| 6,867,858 B2 | 3/2005 | Owen et al. | |
| 6,874,361 B1 | 4/2005 | Meltz et al. | |
| 6,880,646 B2 | 4/2005 | Batarseh | |
| 6,888,097 B2 | 5/2005 | Batarseh | |
| 6,888,127 B2 | 5/2005 | Jones et al. | |
| 6,912,898 B2 | 7/2005 | Jones et al. | |
| 6,913,079 B2 | 7/2005 | Tubel | |
| 6,957,576 B2 | 10/2005 | Skinner et al. | |
| 6,967,322 B2 | 11/2005 | Jones et al. | |
| 6,978,832 B2 | 12/2005 | Gardner et al. | |
| 6,994,162 B2 | 2/2006 | Robison | |
| 7,011,151 B2 | 3/2006 | McGarian et al. | |
| 7,062,420 B2 | 6/2006 | Poe, Jr. | |
| 7,124,826 B2 | 10/2006 | Simpson | |
| 7,147,064 B2 | 12/2006 | Batarseh et al. | |
| 7,210,343 B2 | 5/2007 | Shammai et al. | |
| 7,284,607 B2 | 10/2007 | Araque et al. | |
| 7,487,834 B2 | 2/2009 | Reed et al. | |
| 7,490,664 B2 | 2/2009 | Skinner et al. | |
| 7,537,055 B2 | 5/2009 | Head et al. | |
| 7,647,964 B2 * | 1/2010 | Akbar et al. | 166/193 |
| 7,905,286 B2 * | 3/2011 | Moody et al. | 166/298 |
| 7,934,552 B2 * | 5/2011 | La Rovere | 166/277 |
| 8,118,099 B2 * | 2/2012 | Moody et al. | 166/298 |
| 8,307,900 B2 | 11/2012 | Lynde et al. | |
| 2002/0023758 A1 | 2/2002 | George et al. | |
| 2002/0039465 A1 | 4/2002 | Skinner | |
| 2002/0096324 A1 | 7/2002 | Poe, Jr. | |
| 2002/0189806 A1 | 12/2002 | Davidson et al. | |
| 2003/0000741 A1 | 1/2003 | Rosa | |
| 2003/0094281 A1 | 5/2003 | Tubel | |
| 2003/0098156 A1 * | 5/2003 | Follini et al. | 166/264 |
| 2003/0132029 A1 | 7/2003 | Parker | |
| 2004/0006429 A1 | 1/2004 | Brown | |
| 2004/0011529 A1 | 1/2004 | McGarian et al. | |
| 2004/0016295 A1 | 1/2004 | Skinner et al. | |
| 2004/0020643 A1 | 2/2004 | Thomeer et al. | |
| 2004/0033017 A1 | 2/2004 | Kringlebotn et al. | |
| 2004/0093950 A1 | 5/2004 | Bohnert | |
| 2004/0119471 A1 | 6/2004 | Blanz et al. | |
| 2004/0129418 A1 | 7/2004 | Jee et al. | |
| 2004/0195003 A1 | 10/2004 | Batarseh | |
| 2004/0206505 A1 | 10/2004 | Batarseh | |
| 2004/0207731 A1 | 10/2004 | Bearman et al. | |
| 2004/0211894 A1 | 10/2004 | Hother et al. | |
| 2004/0218176 A1 | 11/2004 | Shammal et al. | |
| 2004/0226723 A1 | 11/2004 | Simpson | |
| 2004/0244970 A1 | 12/2004 | Smith | |
| 2004/0252748 A1 | 12/2004 | Gleitman | |
| 2004/0256103 A1 | 12/2004 | Batarseh | |
| 2005/0012244 A1 | 1/2005 | Jones | |
| 2005/0094129 A1 | 5/2005 | MacDougall | |
| 2005/0099618 A1 | 5/2005 | DiFoggio et al. | |
| 2005/0230107 A1 | 10/2005 | McDaniel et al. | |
| 2005/0252286 A1 | 11/2005 | Ibrahim et al. | |
| 2005/0268704 A1 | 12/2005 | Bissonnette et al. | |
| 2005/0269132 A1 | 12/2005 | Batarseh et al. | |
| 2005/0272512 A1 | 12/2005 | Bissonnette et al. | |
| 2005/0272513 A1 | 12/2005 | Bissonnette et al. | |
| 2005/0272514 A1 | 12/2005 | Bissonnette et al. | |
| 2005/0282645 A1 | 12/2005 | Bissonnette et al. | |
| 2005/0284636 A1 * | 12/2005 | La Rovere et al. | 166/302 |
| 2006/0038997 A1 | 2/2006 | Julian et al. | |
| 2006/0102343 A1 * | 5/2006 | Skinner et al. | 166/250.1 |
| 2006/0137874 A1 | 6/2006 | Araque et al. | |
| 2006/0144591 A1 * | 7/2006 | Gonzalez et al. | 166/277 |
| 2006/0191684 A1 * | 8/2006 | Smith, Jr. | 166/250.1 |
| 2006/0231257 A1 | 10/2006 | Reed et al. | |
| 2006/0231258 A1 | 10/2006 | Head et al. | |
| 2006/0237233 A1 | 10/2006 | Reed et al. | |
| 2007/0051514 A1 * | 3/2007 | La Rovere | 166/277 |
| 2007/0175636 A1 | 8/2007 | McAfee | |
| 2008/0047708 A1 * | 2/2008 | Spencer | 166/288 |
| 2008/0166132 A1 | 7/2008 | Lynde et al. | |
| 2009/0133871 A1 | 5/2009 | Skinner et al. | |
| 2010/0078170 A1 * | 4/2010 | Moody et al. | 166/285 |
| 2010/0078171 A1 * | 4/2010 | Moody et al. | 166/285 |
| 2010/0258304 A1 * | 10/2010 | Hegeman | 166/250.01 |
| 2010/0326659 A1 | 12/2010 | Schultz et al. | |
| 2012/0072188 A1 | 3/2012 | Maerten et al. | |
| 2013/0000906 A1 | 1/2013 | Schultz et al. | |

FOREIGN PATENT DOCUMENTS

| | | |
|---|---|---|
| WO | WO 97/49893 | 12/1997 |
| WO | WO 98/50673 | 11/1998 |
| WO | WO 02/057805 | 7/2002 |
| WO | WO 2004/009958 A1 | 1/2004 |
| WO | WO 2006/008155 A1 | 1/2006 |
| WO | WO 2006/054079 A1 | 5/2006 |

OTHER PUBLICATIONS

Ramona M. Graves, et al., "Temperatures Induced by High Power Lasers: Effects on Reservoir Rock Strength and Mechanical Properties," SPE/ISRM 78154, Society of Petroleum Engineers, copyright 2002, pp. 1-7.

Industry Consortium Forum, Improving Oil and Gas Well Perforations with High-Energy Lasers, Gas Technology Institute, May 14, 2002, 5 pages.

Brian C. Gahan, "Laser Drilling: Understanding Laser/Rock Interaction Fundamentals," Gas TIPS, Spring 2002, pp. 4-8.

Z. Xu, et al., "Specific Energy for Laser Removal of Rocks," 20th International Congress on Applications of Lasers and Electro-Optics, Jacksonville, Florida, Oct. 15-18, 2001, 8 pages.

B.C. Gahan, et al., "Laser Drilling: Drilling with the Power of Light Phase 1: Topical Report," DOE Cooperative Agreement No. DE-FC-26-00NT40917, Sep. 2001, 150 pages.

Halliburton, LaserStrat™ Service, Oct. 16, 2003, 3 pages.

Halliburton, LaserStrat™ Service, "Chemical Fingerprinting and Chemostratigraphic Correlation of Formations,", Oct. 16, 2003, 4 pages.

John Dakin and Brian Culshaw, "Optical Fiber Sensors Volume Four Applications, Analysis, and Future Trends," Sections 7.2-7.1.1.2; copyright 1997, 8 pages.

Search Report Under Section 17(5) for application No. GB0523070.1 mailed Jan. 23, 2006, 4 pages.

International Preliminary Report on Patentability (1 page); and Written Opinion of the International Searching Authority (10 pages), mailed May 2011, for related international application PCT/US2010/040398.

Website: http://www.ipgphotonics.com/products_telecom_modules_lasers.htm, "Lasers", copyrighted by IPG Potonics Corporation, printed on Jan. 30, 2009, 1 page.

Website: http://www.ipgphotonics.com/products_telecom_rack_lasers.htm, "Rack Mounted Lasers", copyrighted by IPG Photonics Corporation, printed on Jan. 30, 2009, 1 page.

Website: http://www.ipgphotonics.com/products_telecom_raman_RLT_M_Series_Raman_Laser_Mo.htm, "RLT-M Series 0.5W to 10W Raman Fiber Laser Modules", copyrighted by IPG Photonics Corporation, printed on Jan. 30, 2009, 1 page.

Website: http://www.ipgphotonics.com/products_telecom_raman_RLT_R_Series_Raman_Laser_Ra.htm, "RLT-M Series Raman Laser Rack Mount", copyrighted by IPG Photonics Corporation, printed on Jan. 30, 2009, 1 page.

Website: http://www.ipgphotonics.com/prod_tel_raman_rlm_series.htm, "RLM Series 1 to 10 Watts Single and Dual Wavelength Raman Fiber Laser", copyrighted by IPG Photonics Corporation, printed on Jan. 30, 2009, 2 pages.

Website: http://www.ipgphotonics.com/products_1micron_lasers_pulsed.htm, "1 Micron Lasers CW", copyrighted by IPG Photonics Corporation, printed on Jan. 30, 2009, 1 page.

Website: http://www.ipgphotonics.com/products_1micron_lasers_cw.htm, "1 Micron Lasers CW", copyrighted by IPG Photonics Corporation, printed on Jan. 30, 2009, 1 page.

Website: http://www.ipgphotonics.com/products_1micron_lasers_single.htm, "YLR LP-SF Series: 1 to 150W Single Frequency Linearly Polarized Ytterbium Fiber Laser", copyrighted by IPG Photonics Corporation, printed on Jan. 30, 2009, 1 page.

Website: http://www.ipgphotonics.com/products_15micron_lasers_cw.htm, "1.5 Microns Lasers CW", copyrighted by IPG Photonics Corporation, printed on Jan. 30, 2009, 1 page.

Website: http://www.ipgphotonics.com/products_15micron_lasers_pulsed.htm, "ELP Series: 0.1-0.5 mJ Pulsed Erbium Fiber Laser", copyrighted by IPG Photonics Corporation, printed on Jan. 30, 2009, 2 pages.

Website: http://www.ipgphotonics.com/products_15micron_lasers_single.htm, "ELR SF Series: 1-100 Watt Single Frequency Erbium Fiber Laser", copyrighted by IPG Photonics Corporation, printed on Jan. 30, 2009, 2 pages.

Website: http://www.ipgphotonics.com/products_15micron_lasers_tunable.htm, "ELT Series: 100 mW to 25W C+L Band Tunable Erbium Fiber Lasers", copyrighted by IPG Photonics Corporation, printed on Jan. 30, 2009, 2 pages.

Website: http://www.ipgphotonics.com/products_2micron_laser_cw.htm, "2 Microns Lasers CW", copyrighted by IPG Photonics Corporation, printed on Jan. 30, 2009, 1 page.

Website: http://www.ipgphotonics.com/products_2micron_laser_tunable.htm, "TLT Series: 0.1-20W Tunable Thulium Fiber Lasers", copyrighted by IPG Photonics Corporation, printed on Jan. 30, 2009, 1 page.

Website: http://www.ipgphotonics.com/products_ipld_9_series.htm, "iPLD-9 Series: 9W High Power Multimode Laser Diodes", copyrighted by IPG Photonics Corporation, printed on Jan. 30, 2009, 2 pages.

Website: http://www.ipgphotonics.com/products_09micron_ipld_20_series.htm, "iPLD-20 Series: 20W High Power Multimode Laser Diodes", copyrighted by IPG Photonics Corporation, printed on Jan. 30, 2009, 2 pages.

Website: http://www.ipgphotonics.com/09_micron_direct_diode.htm, "Direct diode fiber delivered at 980 nanometers", copyrighted by IPG Photonics Corporation, printed on Jan. 30, 2009, 1 page.

Website: http://www.ipgphotonics.com/apps_mat_diode_dlr_series.htm, "DLR Series: 5W to 10kW Direct Diode Fiber Pigtailed Laser Systems", copyrighted by IPG Photonics Corporation, printed on Jan. 30, 2009, 1 page.

Website: http://www.ipgphotonics.com/apps_mat_lab_cutting.htm, "Laser Cutting with Ytterbium Lasers", copyrighted by IPG Photonics Corporation, printed on Jan. 30, 2009, 2 pages.

Website: http://www.ipgphotonics.com/apps_mat_lab_drilling.htm, "Laser Drilling with Ytterbium Lasers", copyrighted by IPG Photonics Corporation, printed on Jan. 30, 2009, 2 pages.

"The Emergence of Fiber Optic Sensor Technology," Fiber Optic Sensors: An Introduction for Engineers and Scientists, Wiley Series in Pure and Applied Optics, Copyright 1991 by John Wiley & Sons, Inc., 11 pages.

Xu, Zhiyue, et al., "Laser Spallation of Rocks for Oil Well Drilling," Proceedings of the 23rd International Congress on Applications of Lasers and Electro-Optics 2004, 6 pages.

Prosecution history of U.S. Appl. No. 10/987,923, filed Nov. 12, 2004.

* cited by examiner

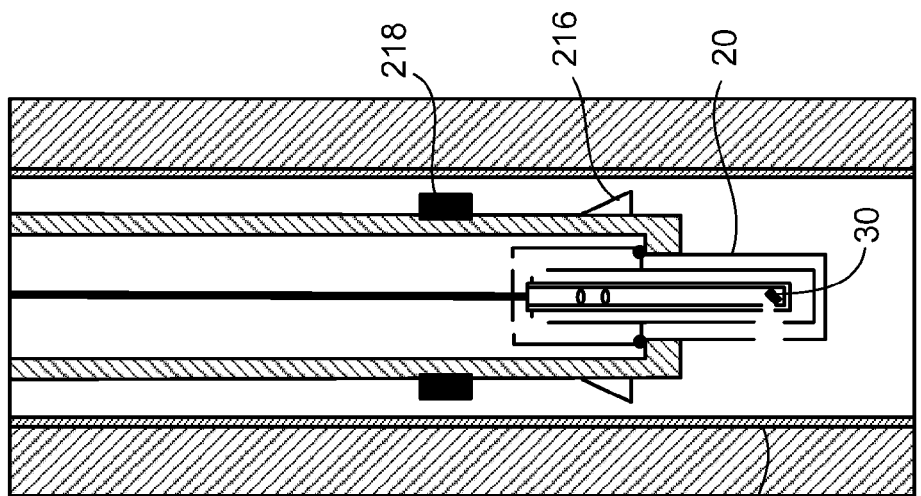
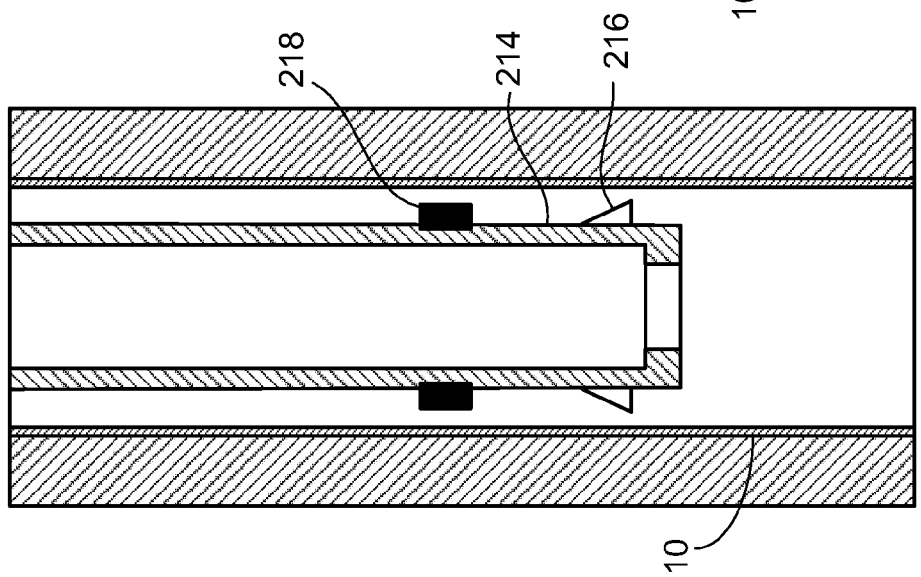
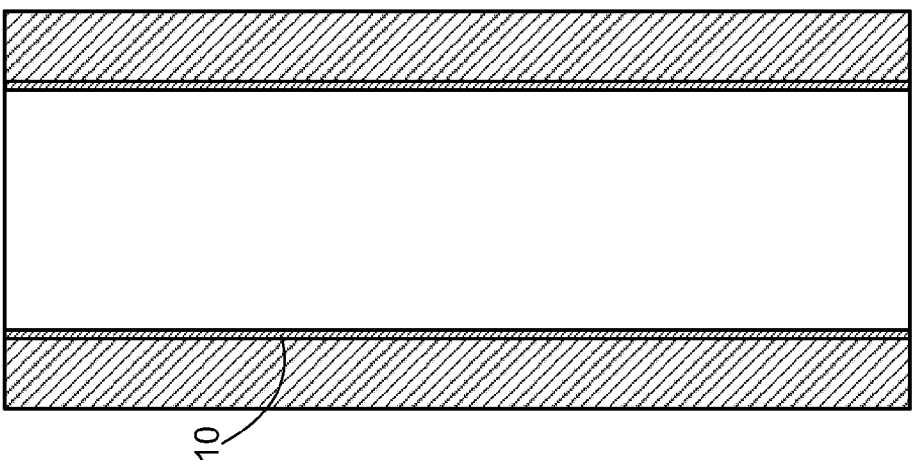

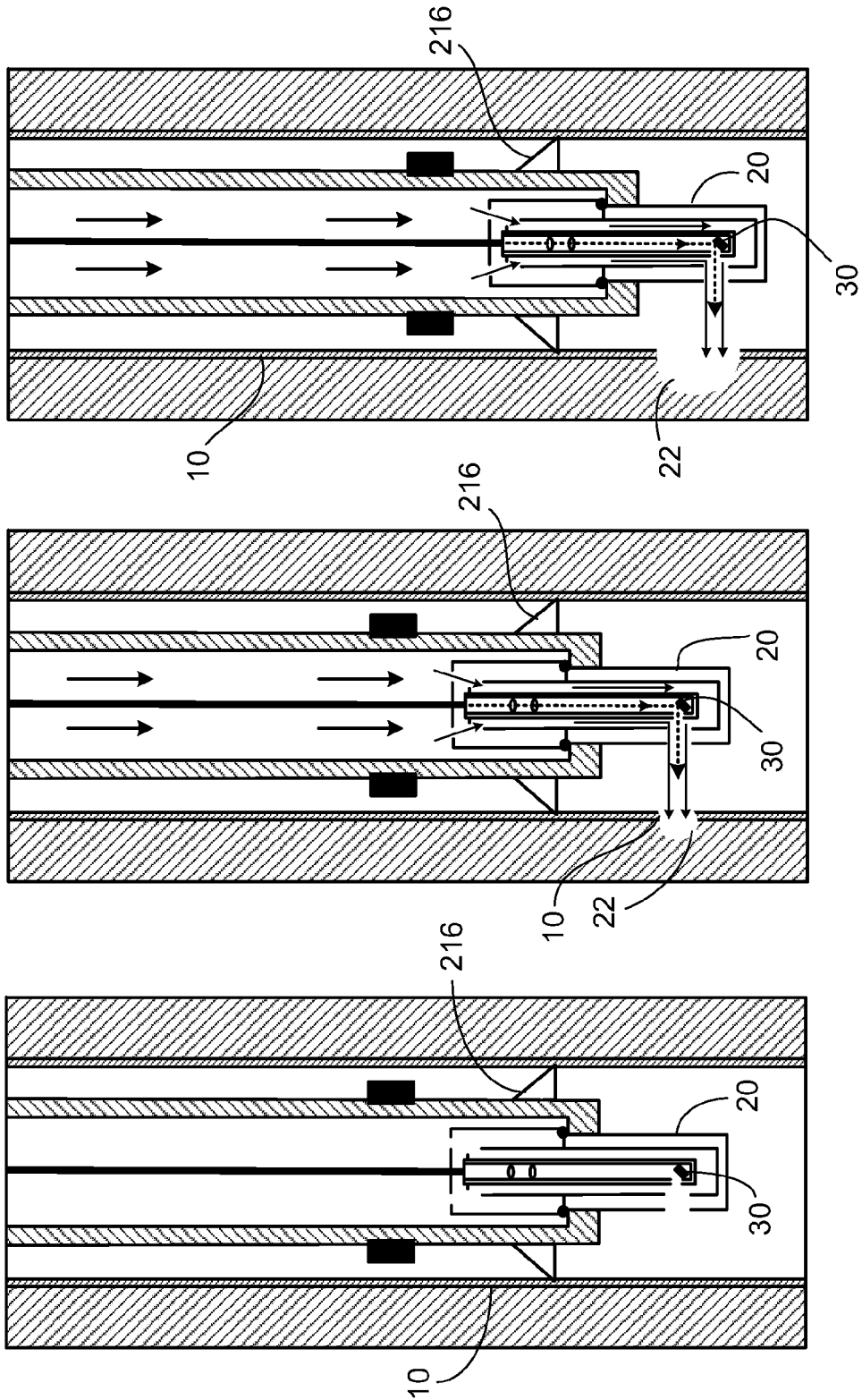

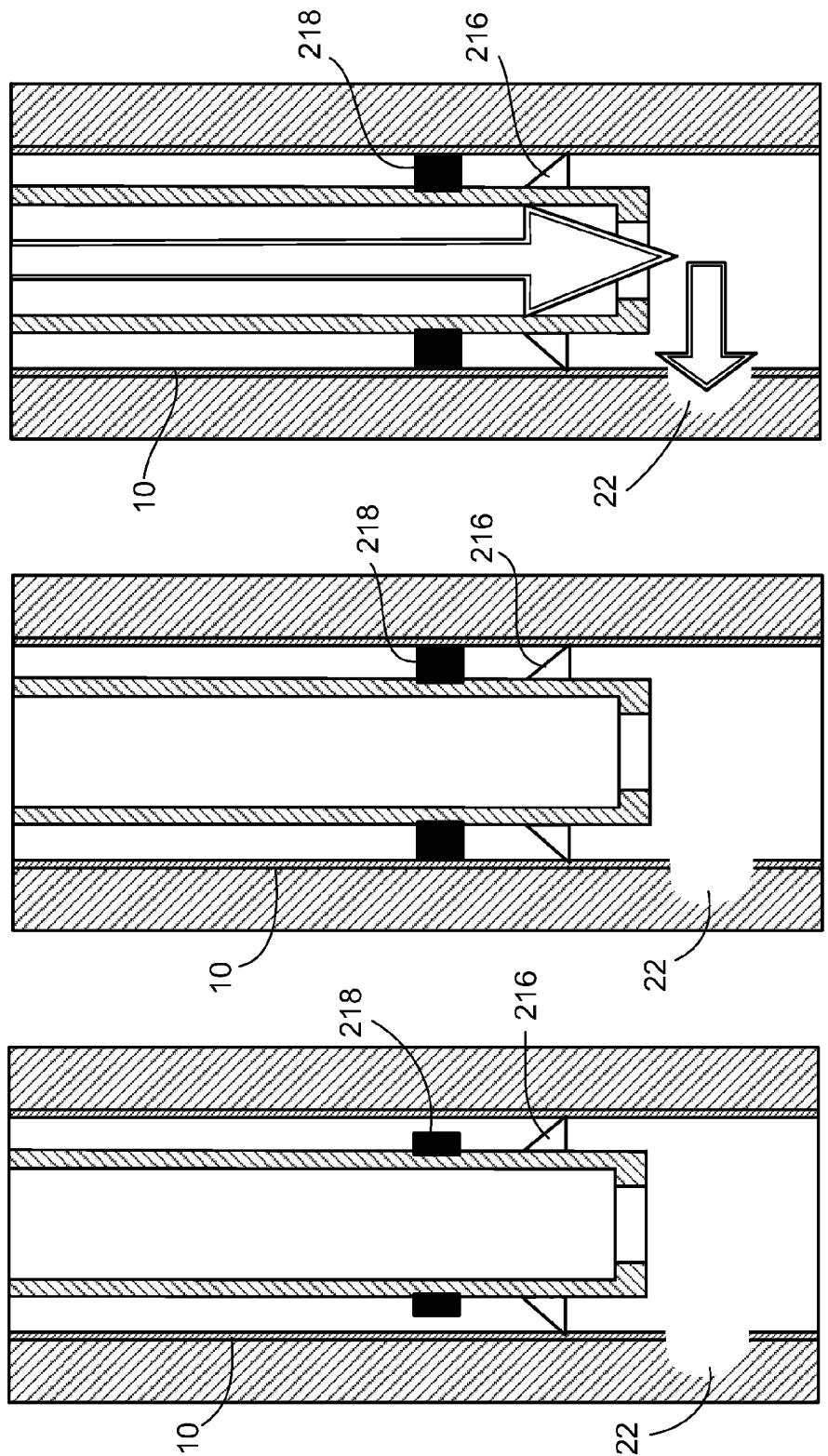

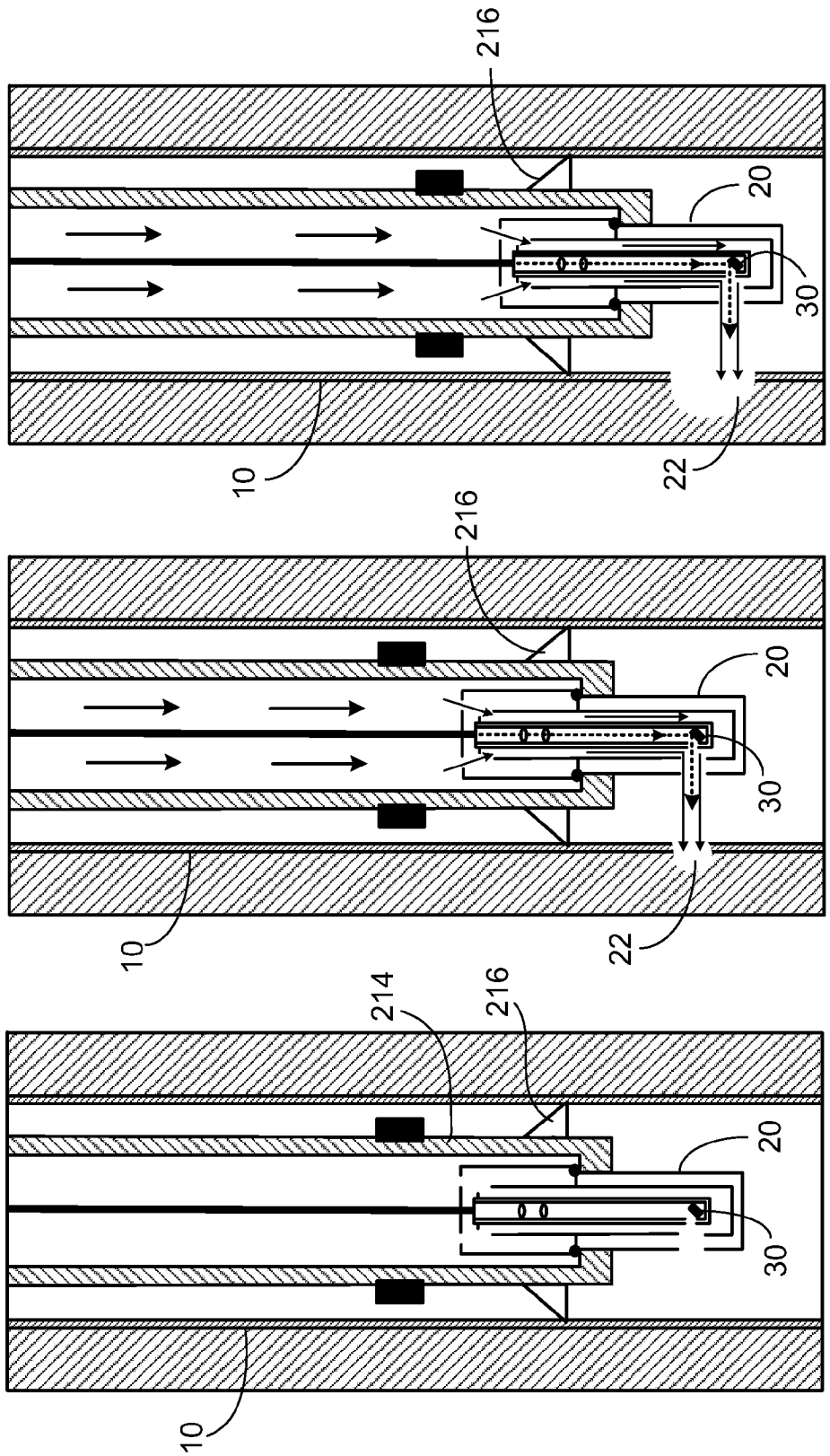

WELLBORE LASER OPERATIONS

CLAIM OF PRIORITY

This U.S. patent application is a continuation application under 35 U.S.C. §120 of U.S. patent application Ser. No. 12/825,906, filed Jun. 29, 2010, now U.S. Pat. No. 8,464,794, which claims priority under 35 U.S.C. §119(e) to U.S. Provisional Application 61/221,418, filed on Jun. 29, 2009, the disclosure of both being considered part of the disclosure of this application and are hereby incorporated by reference in their entirety.

TECHNICAL FIELD

The present disclosure relates generally to stimulating and completing a well in an earth formation, and more specifically, to systems and methods for stimulation, sand control, perforation, well completion, drilling operations, and near wellbore operations.

BACKGROUND

Once a wellbore has been drilled and one or more zones of interest have been reached, a well casing is run into the wellbore and is set in place by injecting cement or other material into the annulus between the casing and the wellbore. The casing, cement and formation are then perforated to enable flow of fluid from the formation into the interior of the casing.

In the past, the casing, cement and formation have been perforated using bullets or shaped charges. Both techniques, however, may result in a perforation having a positive skin, i.e. localized decreased permeability that reduces the production of formation fluid from the formation into the perforation. It is generally desirable that the perforations have a neutral or a negative skin, i.e. localized increased permeability resulting in an increased production of formation fluid. In addition, these traditional perforating methods rely on the use of explosives, which pose obvious safety, transportation and security issues.

Known perforating techniques, as well as drilling techniques, do not provide any analysis of the formation rock being perforated or drilled. More so, there is no known technique for analyzing the chemical elements and certain other chemical characteristics of formation rock in situ, that is, without removing the rock from the well. Such analysis would be helpful in determining the optimal location and depth for the current and other perforations, provide in-situ formation evaluation at the perforation site, or on a larger scale, assist in evaluating the current well or other wells. Presently, to obtain an analysis of the formation rock being perforated or drilled, a representative sample of the formation rock must be retrieved to the surface and analyzed. Depending on whether the analysis can be performed on site, such analysis may add days or even weeks to the well completion. Further, the analysis involves material that may have been altered in the process of removing it from the well.

SUMMARY

The present disclosure is drawn to systems and methods of stimulating and/or perforating that use a laser beam to remove material, such as to perforate the casing, cement and formation. The system and method can further or alternately encompass material analysis that can be performed without removing the material from the wellbore. The analysis can be performed apart from or in connection with stimulation operations and/or perforating the casing, cement and formation.

In some implementations, methods can include: characterizing a subterranean formation; selecting an orientation of an aperture based on characteristics of the subterranean formation; and using a laser to form an aperture of the selected orientation in the wall of the wellbore. In some implementations, methods can include: characterizing a subterranean formation; selecting an aperture shape based on characteristics of the subterranean formation; and using a laser to form an aperture of the selected shape in a wall of the wellbore. In some implementations, methods can include: selecting an orientation of an aperture based on characteristics of the subterranean formation; and using a laser to form an aperture in the selected orientation in the wall of the wellbore. Embodiments of these implementations can include one or more of the following features.

In some embodiments, selecting an orientation can include selecting an orientation aligned to provide greater exposure of the aperture to an axis of preferred permeability. Selecting an orientation can include selecting an orientation aligned relative to direction of principal stress in the formation. Selecting an orientation can also include selecting an orientation to facilitate formation of a fracture that connects with a natural fracture.

In some embodiments, using the laser to form an aperture can include forming an aperture connecting to a pre-existing natural fracture identified while characterizing the formation. Using the laser to form an aperture can include forming apertures at a location selected for fracture initiation. Forming apertures can include forming a aperture that extends along the length of the wellbore and is orthogonal to a formation bedding plane. Forming an aperture can include forming a aperture with a first dimension that increases with increasing distance from an axis of the wellbore. Using the laser to form an aperture can include forming an aperture with negative skin.

In some embodiments, the wall of the wellbore can include a casing and wherein using a laser to form an aperture in a wall of the wellbore can include forming an aperture in the casing. Using a laser to form an aperture in a wall of the wellbore can include forming an aperture extending through the casing into the subterranean formation. In some embodiments, the wall of the wellbore can be an open hole and using a laser to form an aperture in the wall of the wellbore can include forming an aperture in side surfaces of the open hole.

In some embodiments, characterizing a subterranean formation can include characterizing a distribution of sizes of particles in the subterranean formation; and selecting an aperture shape based on characteristics of the subterranean formation can include selecting a slot size to filter particles from fluid in the formation, the slot size selected based on the distribution of sizes of particles in the subterranean formation.

In some embodiments, methods can include: selecting an aperture shape based on characteristics of the subterranean formation; and using a laser to form an aperture of the selected shape in a wall of the wellbore. Selecting an aperture shape based on characteristics of the subterranean formation can include selecting a slot size to filter particles from fluid in the formation, the slot size selected based on the distribution of sizes of particles in the subterranean formation.

In some embodiments, the shapes of the apertures have a maximum dimension that is aligned with a principal stress field of the formation. Selecting the aperture shape can include selecting an aperture shape with a longer axis aligned to expose more of the producing formation than a circular cross-section hole of a similar perimeter.

In some implementations, methods of producing fluids from a wellbore can include: communicating fluids through a first aperture in a wall of the wellbore; and after communicating fluids through the first aperture in the wall of the wellbore, using a laser to seal the first aperture in the wall of the wellbore. Embodiments can include one or more of the following features.

In some embodiments, methods can include, after communicating fluids through the first aperture in the wall of the wellbore, using a laser to form a second aperture in the wall of the wellbore. Communicating fluids through the first aperture in the wall of the wellbore can include producing fluids through the first aperture in the wall of the wellbore. Communicating fluids through the first aperture in the wall of the wellbore can include introducing fluids into a subterranean zone from the wellbore through the first aperture in the wall of the wellbore. Methods can include producing fluids through the second aperture in the wall of the wellbore.

In some embodiments, the wall of the wellbore can include a casing and using the laser to seal the first aperture in a wall of the wellbore can include sealing an aperture in the casing. Sealing the aperture in the casing can include fusing shut apertures in the casing. Fusing shut an aperture in the casing can include heating the casing such that opposite sides of the aperture fuse together or can include selectively laser sintering fusible powders.

In some embodiments, the wall of the wellbore is an open hole and using a laser to seal an aperture in the wall of the wellbore can include sealing an aperture in side surfaces of the open hole.

In some implementations, methods of producing fluids from a well having an existing production profile and a specified production profile can include: if the existing production profile does not match specified production profile, receiving location information on apertures selected to achieve the specified production profile; running a laser tool into a wellbore of the well; and operating the laser tool to change a flow distribution of the wellbore to cause the existing production profile to more closely match the specified production profile. Embodiments can include one or more of the following features.

In some embodiments, operating the laser tool to change the flow distribution of the wellbore can include forming apertures in the wellbore using the laser and/or sealing apertures in the wellbore using the laser. Changing the flow distribution of the wellbore can include balancing flow along a substantially horizontal wellbore by changing the distribution of apertures along a substantially horizontal wellbore.

In some embodiments, changing the production profile of the wellbore over time can include producing fluids from one subterranean zone and then forming apertures to access a second subterranean zone. Methods can include sealing apertures providing fluid communication from the first subterranean zone to the wellbore.

In some embodiments, a wall of the wellbore can include a casing and sealing apertures of the wellbore can include sealing apertures in the casing. A wall of the wellbore can be an open hole and sealing apertures of the wellbore can include sealing an aperture in a side surfaces of the open hole.

In some embodiments, forming apertures in the wellbore using the laser can include selecting an aperture geometry to filter solids from fluid in the formation (e.g., a slot with a slot size selected based on a distribution of sizes of particles in the subterranean formation; and using a laser to form slots with the selected aperture geometry in a casing installed in the wellbore in the subterranean zone. Selecting the aperture geometry to filter particles from fluid in the formation can include selecting the aperture geometry to control sand production including formation fines.

In some implementations, methods of forming a well in a subterranean formation can include: selecting an aperture geometry to filter solids from fluid in the formation, the aperture geometry selected based on a distribution of sizes of particles in the subterranean formation; and using a laser to form slots with the selected aperture geometry in a casing installed in the wellbore in the subterranean zone. In some implementations, methods can include: selecting a slot size of apertures to control sand production including formation fines in fluid in a formation, the slot size selected based on a distribution of sizes of particles in the subterranean zone; and using a laser to form apertures with the selected slot size in a casing installed in a wellbore in the subterranean zone. In some implementations, methods can include: selecting an aperture geometry to filter solids from fluid in the formation, the aperture geometry selected based on a distribution of sizes of particles in the subterranean formation; using a laser to form slots with the selected aperture geometry in a casing installed in the wellbore in the subterranean formation; and producing fluid from the subterranean formation through wellbore. Embodiments can include one or more of the following features.

In some embodiments, selecting the aperture geometry to filter solids from fluid in the formation can include selecting an aperture geometry to filter particles from fluid in the formation. Selecting the aperture geometry to filter particles from fluid in the formation can include selecting the aperture geometry to control sand production including formation fines. in particular, selecting an aperture geometry to filter particles from fluid in the formation can include selecting the aperture geometry in which the cross-section of individual apertures in the casing decrease with increasing distance from a central axis of the casing such that a smallest portion of each aperture is at the outer surface of the casing.

In some embodiments, the subterranean zone can include an unconsolidated formation and selecting the aperture geometry to filter solids from fluid in the formation can include selecting an aperture geometry to maintain structural stability of the unconsolidated formation.

In some embodiments, method can also include, in response to levels of particles in fluid being produced through the wellbore, operating the laser to change a flow distribution of the wellbore. Operating the laser tool to change the flow distribution of the wellbore can include forming apertures in the wellbore using the laser and/or sealing apertures in the wellbore using the laser. Methods can also include sealing first apertures extending through the casing and forming second apertures extending through the casing of the wellbore, the second apertures having a different geometry than the first apertures. In some cases, a width of the second apertures is smaller than a width of the first apertures.

In some embodiments, selecting the slot size of apertures to control sand production including formation fines in fluid in the subterranean zone can include selecting an aperture geometry in which the cross-section of individual apertures in the casing decrease with increasing distance from a central axis of the casing such that a smallest portion of each aperture is at the outer surface of the casing. In some cases, the subterranean zone can include an unconsolidated formation and selecting the slot size of the apertures to control sand production including formation fines in fluid in the formation can include selecting an aperture geometry and distribution to maintain structural stability of the unconsolidated formation.

In some implementations, methods of installing downhole equipment in a wellbore can include: forming a profile in a wall of the wellbore using a laser; inserting a piece of downhole equipment into the wellbore such that a portion of the piece of downhole equipment is aligned with the profile formed in the wall of the wellbore; engaging the profile formed in the wall of the wellbore with the piece of downhole equipment. In some implementations, methods of installing downhole equipment in a wellbore can include: using a laser to form a recess in an inner surface of a casing installed in the wellbore; inserting a piece of downhole equipment into the wellbore; and deploying an extendable dog on the piece of downhole equipment to matingly engage the recess in the inner surface of a casing of the wellbore. In some implementations, methods can include: using a laser to form a window extending through a casing installed in a wellbore; inserting a piece of downhole equipment into the wellbore; and engaging the window formed in the wall of the wellbore with the piece of downhole equipment. Embodiments can include one or more of the following features.

In some embodiments, forming the profile can include forming a female profile in the wall of the wellbore. Forming the female profile in the wall of the wellbore can include forming a recess in a casing installed in the wellbore. Forming the recess in the casing installed in the wellbore can include forming a recess that only extends partway through the casing. In some cases, the female profile is sized and positioned to receive extendable dogs on the piece of downhole equipment.

In some embodiments, forming the female profile can include forming an annular recess extending around an inner diameter of the casing. In some embodiments, forming the female profile can include forming multiple discrete recesses formed at a common distance from an entrance of the wellbore.

In some embodiments, the piece of downhole equipment is a seal, a pump, liner hanger, or a downhole steam generator.

In some embodiments, methods can include inserting the piece of downhole equipment into the wellbore such that the extendable dogs on the piece of downhole equipment are aligned with the recesses in the surfaces of the wellbore; and extending the extendable dogs on the specific piece of downhole equipment to matingly engage the recesses in the surfaces of the wellbore.

In some embodiments, forming the profile can include forming a window extending through a casing installed in the wellbore. In some cases, the window is sized to receive a junction. Methods can include deploying the junction into the wellbore such that the junction is aligned with the window; and inserting the junction into and extending through the window. In some cases, methods can include sealing the window after inserting the junction into and extending through the window.

In some embodiments, electric wirelines incorporating downhole lasers can be used in place of or in addition to conventional methods of setting and/or unsetting downhole tools such as setting/unsetting with weight, setting/unsetting using tubular-supplied hydraulics, or setting/setting with wireline through the use of explosives. Similarly, in some embodiments, electric wirelines incorporating downhole lasers can be used in place of or in addition to conventional methods of freeing stuck downhole tools such as using tubulars in a fishing operation or drilling to remove the tools. The use of electric wireline with a downhole laser for these operations can be faster and often more precise. Other electric wireline tools can be combined with the laser to provide data telemetry, retrieval or setting heads, depth correlation, and electric controls.

An advantage of some of the implementations is that they may enable at least one chemical characteristic of an earth formation to be determined without removing the formation or the analysis tool from the wellbore. Therefore, chemical analysis can be performed during a single trip of the drilling string, tubing string or wireline into the wellbore. Multiple locations (both axially and circumferentially) in the wellbore can be analyzed during the same trip. In the case of drilling or perforating, the analysis can be performed without having to remove the drilling or perforating equipment, and the analysis can be performed concurrently with the drilling or perforating processes. Such concurrent analysis enables more frequent sampling of the formation, as well as, more ready use of the formation information in drilling or perforating.

An advantage of some of the implementations is that material can be removed or analyzed in two or more locations substantially concurrently.

An advantage of some of the implementations is that material can be removed or heated in specified patterns, for example, circumferential grooves or conical perforations.

An advantage of some of the implementations is that increased permeability (negative skin) develops in the formation in the area of the material removed.

An advantage of some of the implementations is that perforations may be made without the use of explosives.

An advantage of some implementations is that techniques based on the use of electric wirelines with downhole lasers can remove the requirement for explosives to be shipped to location and run into the hole. These techniques can also reduce the likelihood that sensitive tools such as pressure sensors and other data gathering sensors are damaged during, for example, tool setting using explosives. In addition, these techniques can provide the ability to run and retrieve downhole tools with electric line with very accurate depth correlation.

An advantage of some implementations is that downhole lasers can be used to glaze or resurface surfaces downhole. In some instances, after extended periods of hydrocarbon production, this can provide a new method of remediating pitting, erosion or other damage that can occur in the surfaces of downhole tools due to incompatibility between the flow constituents of production flow stream and the type of metallurgy used to make the downhole hardware and/or due to other reasons. Being able to glaze/resurface devices downhole can save considerable expense (work-over rig costs and non-producing time) and get the wells to return to production more quickly.

An advantage of some implementations is that lasers can be used to cut windows for lateral completions including multi-lateral completions. Laser cutting of casing may provide improved lateral windows as compared to milling of windows for lateral completions.

In some implementations, laser glazing operations can provide improvements to a metal surface such as hardening of the metal surface, smoothing the metal surface, decreasing the friction coefficient of the surface, and increasing corrosion resistance of the metal surface. Laser glazing, particularly in downhole applications, can provide much higher efficiency than chemical treatments used to try and achieve at least some of the same effects. For downhole oilfield operations, the metal surface improvements provided by laser glazing may enhance multi-lateral milling, drilling, and completion operations. In addition, production equipment may be more cost effectively treated to allow continued production without equipment replacement.

In some implementations, the combination of downhole laser tools and associated downhole video and/or thermal imaging cameras can provide highly efficient devices for freeing tools which are stuck downhole. Normally, impediments to stuck tools downhole require fishing operations with tubulars. These tubulars often encounter difficulty engaging the top of the tools or difficultly freeing the tools once engaged. Downhole video has been used to define the obstruction or configuration of the top of the tool. This requires a separate trip into the wellbore for the video, then customized drilling or fishing devices are run in on tubulars to remove the impediment or reconfigure the top of the tool to allow for proper fishing tool engagement. Much of this work is trial and error and may require several trips with the video camera. By combining laser with the video and/or thermal imaging operation the impediments can be removed in a single trip.

In some implementations, downhole laser tools and operations can be used to remove and/or consolidate formation material downhole to control the degree of communication from the wellbore to the formation. Consolidation may also be achieved or enhanced by selective laser sintering of heat-fusible solids unto the wellbore surfaces. Selective laser sintering may be carried out by depositing a layer of a heat-fusible powder onto surface. Heat-fusible powders include ceramics, metals, and plastic polymers such as ABS plastic, polyvinyl chloride (PVC), polycarbonate, and other polymers. The laser beam heats the powder and sinters the particles into a solid surface. A second layer of powder may be deposited on the sintered surface and again treated with the laser. In this manner, the sintered surface may be built up layer by layer. In some cases, a single sintered layer may be sufficient to form a sufficiently consolidated surface. In addition, certain filter cake formulations may be applied to the wellbore surface during drilling operations. Laser irradiation may be used to further enhance the filter cake such that the wellbore surface is consolidated. These consolidation processes can reduce the amount of fines produced over time. As the same laser can be used to form perforations in the formation, both perforation and formation treatment can be performed in one downhole trip instead of the multiple trips for perforation and formation treatment required today.

Forming perforations using downhole laser tools and methods is compatible with many wireline tools; can be used to provide precision perforations (e.g., clean and highly precise cuts in terms of length, width and depth) on previously installed casing; and can be used in conjunction with technology such as gamma ray logging, casing collar location and/or other technology. This approach can achieve more precise placement and sizing of perforations than explosive shape charge perforating and hydrajetting. Moreover, this approach does not induce compaction damage to the target rock.

In some implementations, lasers can be used to initiate explosives, such as those used in explosive-based perforating guns used in perforating wellbore casings and/or subterranean formations and/or in other operations. Since a laser is used to detonate the explosives, there is no possibility of electrical interference. Only firing of the laser will fire the explosives. No radio silence or other restrictions on the use of electrical equipment during perforating operations are required. This can provide increased safety for personnel onsite as well as reduced chances of accidentally perforating out of zone due to electrical interference. In addition, the elimination of electrical interference issues opens the possibility of combining adding electric conductors to the fiber in the wireline cable so that one can run logging tools during perforating runs. This may enable a savings in rig time due to the ability to combine logging and perforating in a single run.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 7A-7I is a series of side cross-sectional views illustrating the sequence of a laser-initiated treatment process.

FIGS. 8A-8C is a series of side cross-sectional views illustrating a portion of the sequence of a laser-initiated treatment process.

Like reference symbols in the various drawings indicate like elements.

DETAILED DESCRIPTION

Downhole laser tools and techniques can be used to enhance communication between a wellbore and a subterranean formation, to provide adequate flow paths, to reduce potential fluid flow restriction due to formation damage, to allow for more precise design for radial flow into or out of a formation, and to implement stimulation treatments for enhancing fluid flow such as acidizing, sand control or hydraulic fracturing treatments. Downhole laser tools can be deployed, for example, with wireline or tubing (coiled and/or jointed) and is compatible with wellbore configurations without internal diameter restrictions. Perforation techniques can be used to create specific size or geometry for opening(s), from large holes or slots to allow solids such as proppant particles to enter easily, to narrow slots in casing that would allow significant fluid flow into or out of the wellbore while preventing production of solids such as formation sand and proppant. The perforation techniques may be combined with high pressure pumping to create a larger opening and/or to stimulate the formation. For example, laser operations may be performed to perforate and/or initiate a fracture in concert with high pressure pumping operations.

Downhole laser tools and techniques also can be used other applications. For example, downhole laser tools and techniques can be used to treat the surface of downhole equipment in situ; to set and release downhole equipment; to consolidate formation material; and to initiate explosives, such as those used in perforating wellbore casings and/or subterranean formations.

Once a wellbore has been drilled into a formation and casing is set inside the wellbore, communication between the formation and the interior of the well casing is through openings (i.e., perforations) created through the casing and (if present) cement filling the annulus between casing and the formation. The perforations may be through the casing material only, also through an annular fill (such as cement) and stop at formation face, or they may penetrate to some depth into the formation. The perforations may be in the form of approximately circular perforations, elongated slots and/or other shapes.

Figure 1:
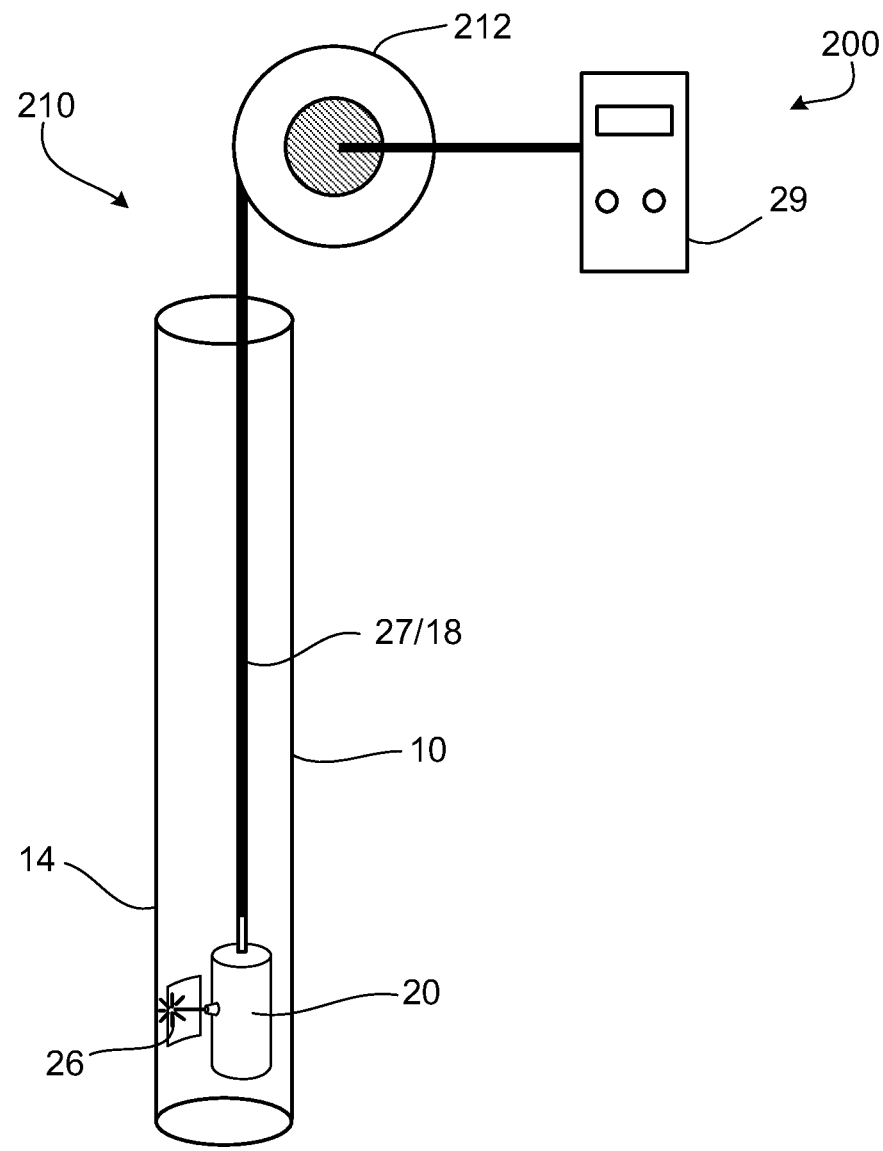
FIG. 1 is a schematic of downhole tool system.

Referring to FIG. 1, an illustrative downhole tool system 200 for use in a wellbore 10 includes a laser source 29 on the surface, a deployment system 210 (spooled, cable, coiled tubing, jointed pipe, etc.), and a laser tool 20. The deployment system 210 can include an umbilical 27 (e.g., cable or tubing (coiled or jointed) with cable on the inner diameter) that, for example, contains optical fibers and/or other waveguide elements used to controllably transmit light from the surface to the laser tool 20. A laser beam 26 (e.g., a high intensity laser beam) can be transmitted from the laser source 29 via a transmission line 27 (e.g., a wireline containing an optical fiber) to the laser tool 20. The downhole tool system 200 can include a mechanism for achieving proper orientation in the wellbore relative to formation properties or other geometric consideration such as depth or direction and/or extendable stabilizers such as those discussed in more detail in U.S. Pat. Pub. No. 2006/0102343, incorporated herein by reference. The downhole tool system 200 can also include an anchoring system (e.g., slips, collets, and/or matching profiles in the tool system 200 and surrounding tubular, such as the casing) for fixing the laser tool 20 in position in the wellbore 10. After the laser tool 20 is temporarily anchored in the wellbore 10, an on-board system such as those discussed in more detail below for moving and adjusting the position of and characteristics of the laser beam can precisely control the characteristics of the directed laser beam 26 such as, for example, the position, cutting depth, and impingement angle. This system can allow very specific and precise entry into the formation from the wellbore to be achieved. In some instances, the laser source 29 can be provided wholly or partially downhole.

Figure 2:
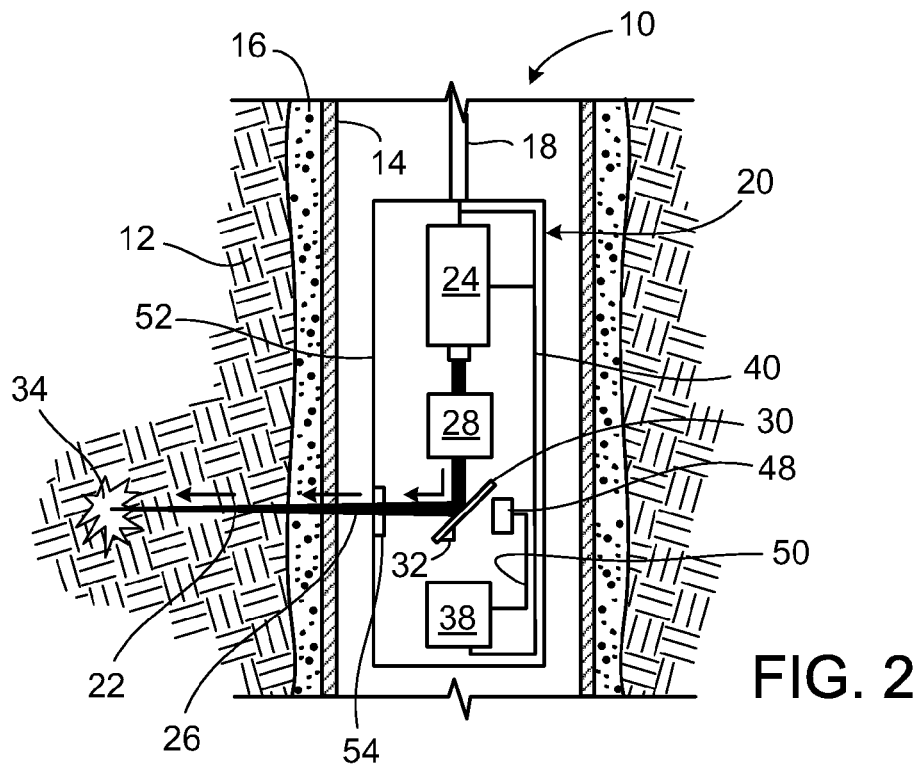
FIG. 2 is a side cross-sectional view of an illustrative laser tool depending from a wireline and depicted perforating a wellbore.
Figure 3:
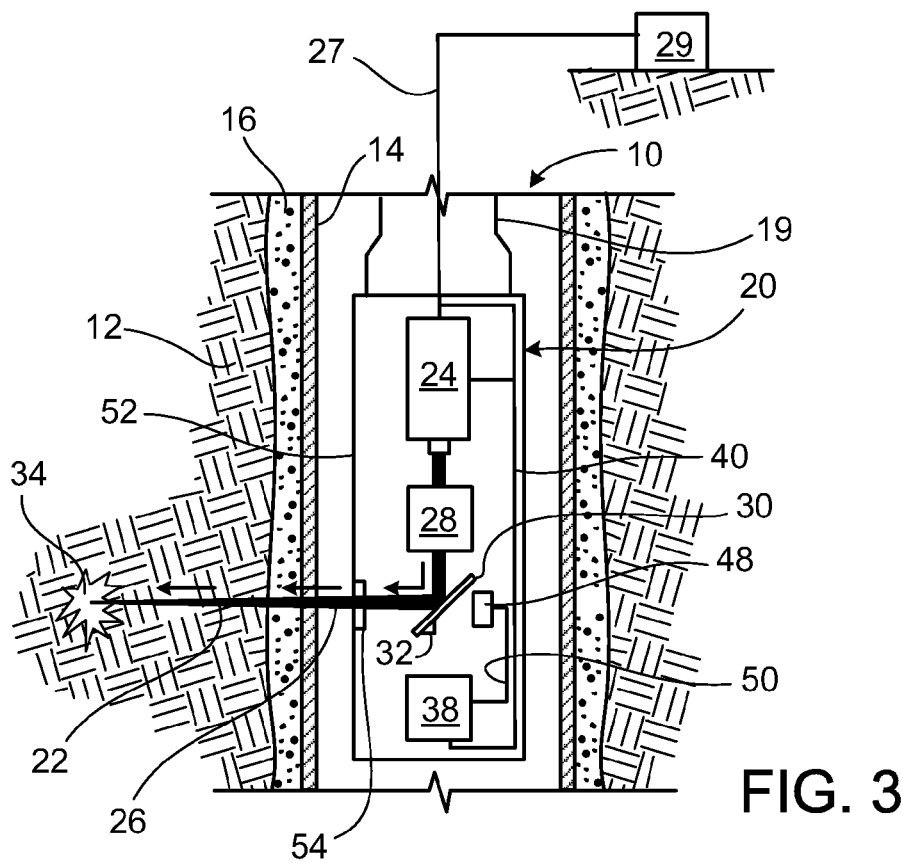
FIG. 3 is a side cross-sectional view of an illustrative laser tool depending from a tubing string and depicted perforating a wellbore.

Referring to FIGS. 2 and 3, the wellbore 10 is illustrated as a cased wellbore in a formation 12 that has a casing 14 affixed therein. A layer of cement or similar material 16 fills an annulus between the casing 14 and the wellbore 10. An embodiment of the laser tool 20 is depicted in use perforating the wellbore 10. The illustrative laser tool 20 is adapted to be inserted into the wellbore 10 depending from a wireline 18 (FIGS. 2 and 4) or a tubing string 19 (FIGS. 3 and 5), and to direct the laser beam 26. Although depicted as removing material from the formation 12 to form a perforation 22, the laser tool 20 can be adapted to also or alternatively drill a new wellbore or extend an existing wellbore. As discussed in more detail in U.S. Pat. Pub. No. 2006/0102343, incorporated herein by reference in its entirety, the laser tool can also be adapted to heat material to emit light for use in laser induced breakdown spectroscopy (LIBS). In addition, a non-destructive laser spectroscopic methods may be used, optionally in combination with drilling and/or stimulation operations, to interrogate formation properties by spectroscopic analysis of the reflected light.

As the illustrative laser tool 20 of FIGS. 2 and 3 is depicted perforating a cased wellbore 10, it is directing the laser beam 26 onto the casing 14, the cement 16, and the formation 12. The illustrative laser tool 20 and related concepts described herein are equally applicable to an "open hole" wellbore. An open hole wellbore is one in which at least a portion of the wellbore has no casing. Furthermore, the laser tool 20 may be used in perforating or drilling through various equipment installed in a wellbore, and is not limited to perforating through casing, cement layers, and formation. When referring to a wall of a wellbore herein, the wall can include any interior surface in the wellbore, such as a sidewall or end/bottom wall thereof.

Figure 4:
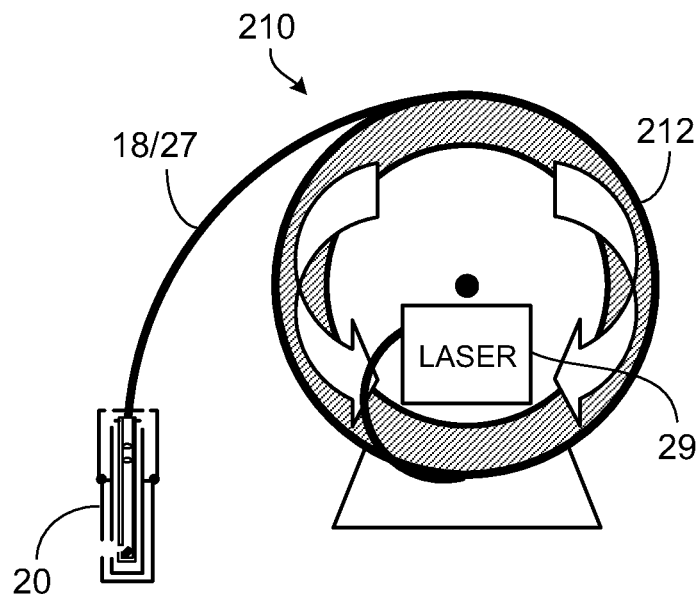
FIG. 4 is a schematic of a downhole tool system with a wireline.
Figure 5:
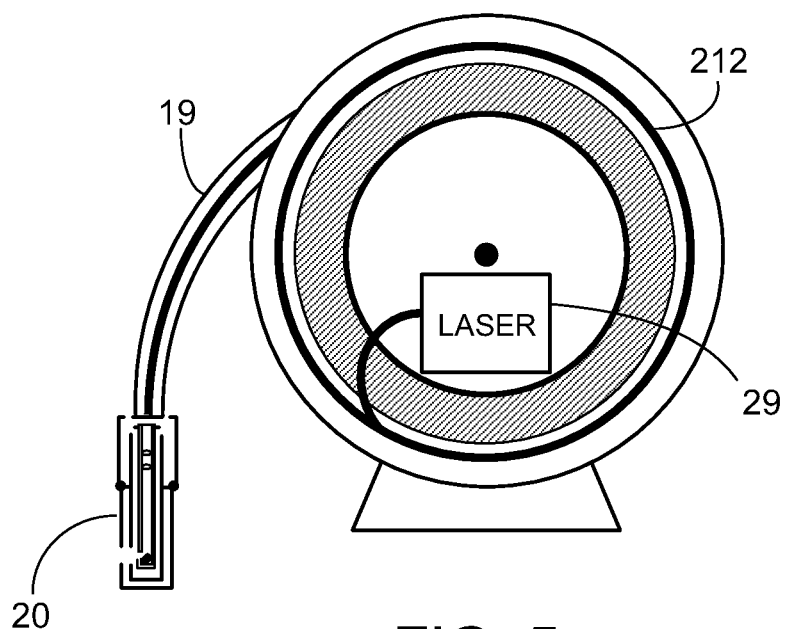
FIG. 5 is a schematic of a downhole tool system with a coiled tubing string.

The downhole deployment system 210 can include of a spool 212 for the umbilical (e.g., wireline 18 in FIG. 4 or coiled tubing string 19 in FIG. 5). In some embodiments, as shown in FIGS. 4 and 5, such laser sources 29 can be small enough to mount on the inner surface of the spool 212 holding the wireline 18 or coiled tubing string 19. Mounting the laser in the spool eliminates the need for rotary optical couplers connecting the cable on the spool to the laser because the laser source 29 moves with rotation of the spool 212.

In some embodiments, the laser tool 20 and cable can be carried down hole by a mobile device such as for example, a wireline deployed self-propelled robotic device (e.g., well tractor), rather than on tubing or the cable alone. This technique may have advantages in horizontal or highly deviated wells. In this approach, the tractor acts as the slips to anchor the tool in position and rather than moving the tool with a hydraulic section, the tractor can controllable move the laser tool 20 when extending an initial perforation. For example, long, continuous slots can be formed by activating the laser tool 20 while the well tractor moves the laser tool 20 along the well bore.

Power and/or signals may be communicated between the surface and the laser tool 20. Wireline 18 may include one or more electrical conductors which may convey electrical power and/or communication signals. Wireline 18 may additionally or alternatively include one or more optical fibers which may convey light (e.g. laser) power, optical spectra, and/or optical communication signals. Neither the communication of power, nor signals to/from the surface, are necessary for the operation of the implementations. In lieu of such communication, downhole batteries and/or downhole generators may be used to supply the laser tool 20 power. A downhole processor may be employed to control the laser tool 20, with relatively little (as compared to wireline) or no communication from the surface. For example, instructions for performing operations may be preprogrammed into a processor installed in the laser tool 20 before running the laser tool 20 into the wellbore 10 and/or the laser tool 20 may respond to simple commands conveyed via surface operations such as rotary on/off, relatively low data rate mud-pulse, electromagnetic telemetry, and acoustic telemetry communication.

In implementations incorporating a tubing string 19, the tubing may be continuous tubing or jointed pipe and may be a drilling string. The tubing string 19 may incorporate a wireline 18 as described above. Tubing string 19 may be "wired drill pipe," i.e. a tubing having communication and power pathways incorporated therein, such as the wired drill pipe sold under the trademark Intellipipe by Grant Prideco, Inc. The tubing string 19 may contain a smaller tubing string within for conveying fluids such as those used in the fluid based light path described below or for conveying chemicals used by the laser.

In addition to waveguides to transmit laser light from the surface to downhole, the umbilical may also contain optical fibers and sensors to measure the temperature distribution of the umbilical along its length. These measurements can be used to detect hot spots where the umbilical may be damaged and deteriorating as a result of damage. By identifying damaged or abnormally hot sections of the umbilical, a potentially dangerous umbilical breach or umbilical failure may be avoided. Additionally under normal operations, it would be desirable to know the temperature distribution of the umbilical in order to help insure that the umbilical is operated only under specified conditions which can to help provide a long service life.

The laser tool 20 can also include other features such as, for example, an extendable light path and/or a snorkel as described in more detail in U.S. Pat. Pub. No. 2006/0102343.

The laser tool 20 can control the timing, direction, focus and power of the laser beam 26. Different light patterns can be applied by varying the timing (i.e. pulsing), direction, focus, and power of the laser beam 26 depending on the type of materials to be removed, treated, or analyzed, for example, the casing 14, the cement 16 and different types of rock in the formation 12. Accordingly, in removing material, the laser beam 26 light patterns can be adjusted to crack, spall, melt, or vaporize the materials to be removed and change as the material type changes. The laser beam 26 can be configured to remove material in a single continuous pulse or multiple pulses. The multiple pulses may be cyclical, such as in a duty cycle. The power of the laser beam 26 can be selected such that the duty cycle necessary to remove the material in the desired manner (crack, spall, melt or vaporize) is less than 100%. In most instances of removing material during perforating operations, the laser beam 26 is directed on the formation with a duty cycle that causes the rock to chip or spall. Laser beam/tool configurations including pulse strategies are discussed in more detail in U.S. Pat. Pub. No. 2006/0102343.

In FIGS. 2 and 3, the illustrative laser tool 20 includes a laser beam device 24. The laser tool 20 may optionally be provided with a focusing array 28 through which the laser beam 26 passes. Additional details regarding focusing arrays and their operation are discussed in more detail in U.S. Pat. Pub. No. 2006/0102343.

The laser beam device 24 may relay the laser beam 26 generated remotely from the laser tool 20, such as generated by a laser source 29 on the surface and input into the laser beam device 24 via a transmission line 27 (FIG. 3), such as an optical fiber or light path. In some embodiments, rather than relaying a laser beam generated at the surface, the laser beam device 24 generates the laser beam 26. In such embodiments, the laser beam device 24 may be, for example, an electrical, electro-chemical laser or chemical laser, such as a diode laser or an excimer or pulsed Na:YAG laser, dye laser, CO laser, $CO_2$ laser, fiber laser, chemical oxygen iodine laser (COIL), or electric discharge oxygen iodine laser (DOIL). In some implementations it may be desirable to use a DOIL to increase service intervals of the laser tool 20, because a DOIL does not substantially consume the chemicals used in creating the laser beam and the chemicals need not be replenished for an extended duration. It is to be understood that the examples of particular lasers disclosed herein are for illustrative purposes and not meant to limit the scope of the claims.

Additionally, the laser tool 20 can include hydraulic channels running through the laser tool 20 so that fluid pumped around the cable can pass through the laser tool 20. Such fluid can provide a liquid purge for maintaining a relatively clean light path from the laser tool 20 to the formation, can help remove debris and cuttings produced by the action of the laser, and can cool the laser tool 20. In an embodiment, a gas and a liquid purge may be used in combination to remove debris and cuttings produced by the laser. By way of example, referring to FIG. 3, window 54 may be modified such the window may be opened to form an aperture. Optionally the aperture may be fitted with an extension channel fitted to the outer wall of laser tool 20. Gas may be pumped down the tubing string 19 to provide a clear path for the laser beam 26. At the same time, a liquid purge may be pumped down the annular space between the tubing string 19 and the casing 14 to remove debris and cuttings. In some embodiments, the laser tool 20 can be made to rotate along its longitudinal axis to move the beam in an arc or circle around the wellbore.

Some or all of the components of the laser tool 20 can be encased in a housing 52. The housing 52 can have one or more windows 54 adapted to allow passage of the laser beam 26 out of the housing 52 and emitted light 36 into the housing 52. The size and shape of the windows 54 accommodate the aiming capabilities of the laser beam 26 and receipt of emitted light 36. The windows 54 are further adapted to withstand the elevated pressures and temperatures experienced in the wellbore 10. Some examples of materials for constructing the windows 54 may be glass, silica, sapphire, or numerous other materials with appropriate optical and strength properties. The windows 54 may have anti-reflection coatings applied to one or both surfaces to maximize the transmission of optical power therethrough while minimizing reflections. The windows 54 may comprise a plurality of optical fibers positioned to direct the laser beam 26 or collect emitted light 36 from multiple locations about the wellbore 10. For example the optical fibers may be fanned radially about the laser tool 20.

Although the laser beam device 24 can be oriented to fire directly towards the material being removed or heated in one or more trajectories, the illustrative laser tool 20 is configured with the laser beam device 24 firing into a reflector 30. The reflector 30 directs the laser beam 26 toward the formation 12 and may be operated to assist in focusing the laser beam 26 or operate alone in (when no focusing array 28 is provided) focusing the laser beam 26 into the material being removed. In the illustrative laser tool 20 of FIGS. 2 and 3, the laser beam 26 is directed substantially longitudinally through the laser tool 20 and the reflector 30 directs the laser beam 26 substantially laterally into the wellbore 10. The laser tool 20 can be configured to fire the laser beam 26 in other directions, for example, down.

The laser beam 26 may be directed to remove material or heat various points around the wellbore 10 and in varying patterns. In an illustrative laser tool 20 having a reflector 30, the reflector 30 can be movable in one or more directions of movement by a remotely controlled servo 32 to control the direction, i.e. trajectory, of the reflected laser beam 26. In a laser tool where the laser beam device 24 fires directly into the formation 12 or in a laser tool having a reflector 30, the laser beam device 24 can be movable by control servo to control the trajectory of the laser. In lieu of or in combination with a reflector 30, the laser beam can be directed into the formation 12 using a light path (see FIG. 6D, discussed below), such as a fiber optic, that may optionally be movable by control servo to control the trajectory of the laser beam. The light path may include multiple paths, such as a fiber optic array, that each direct the laser beam in a different trajectory. The multiple paths can be used selectively, individually or in multiples, to direct the laser beam in different trajectories.

Figure 6A:
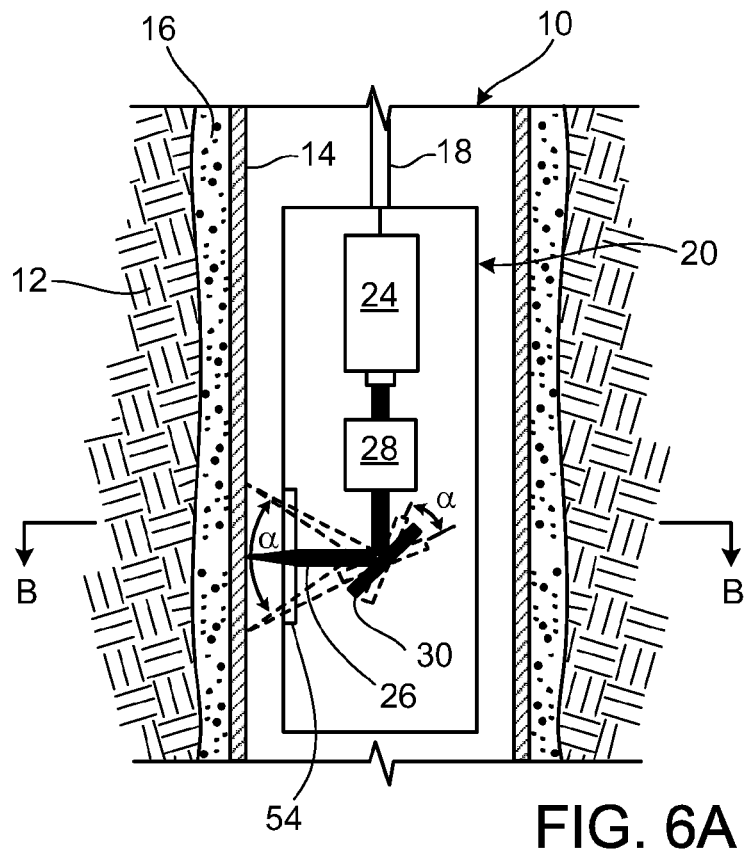
FIG. 6A is a side cross-sectional view of the illustrative laser tool of FIG. 2 showing different trajectories of the laser beam.
Figure 6B:
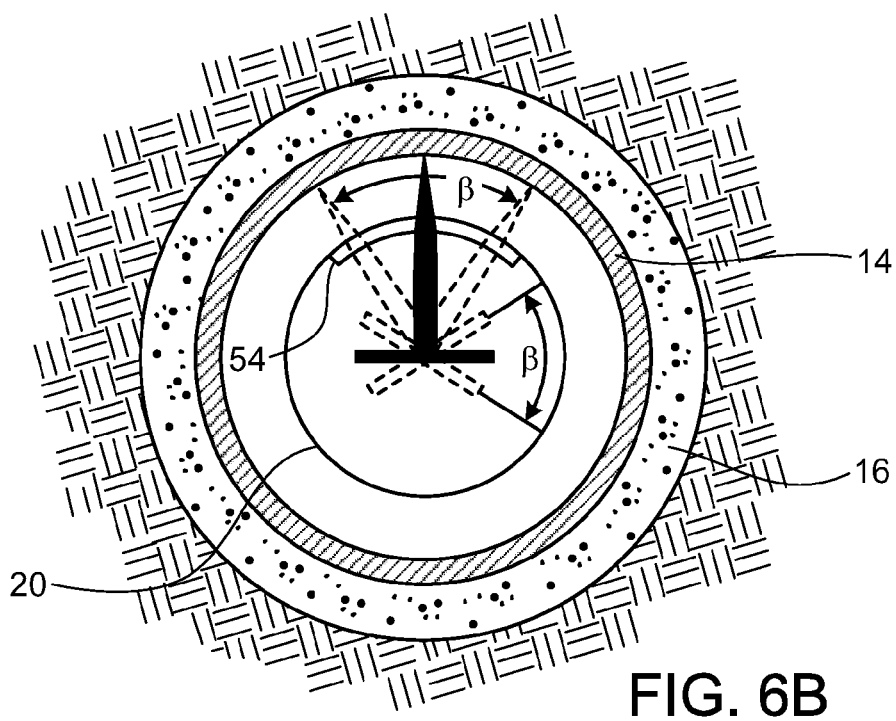
FIG. 6B is a cross-sectional view of FIG. 6A along section line B-B showing different trajectories of the laser beam.
Figure 6C:
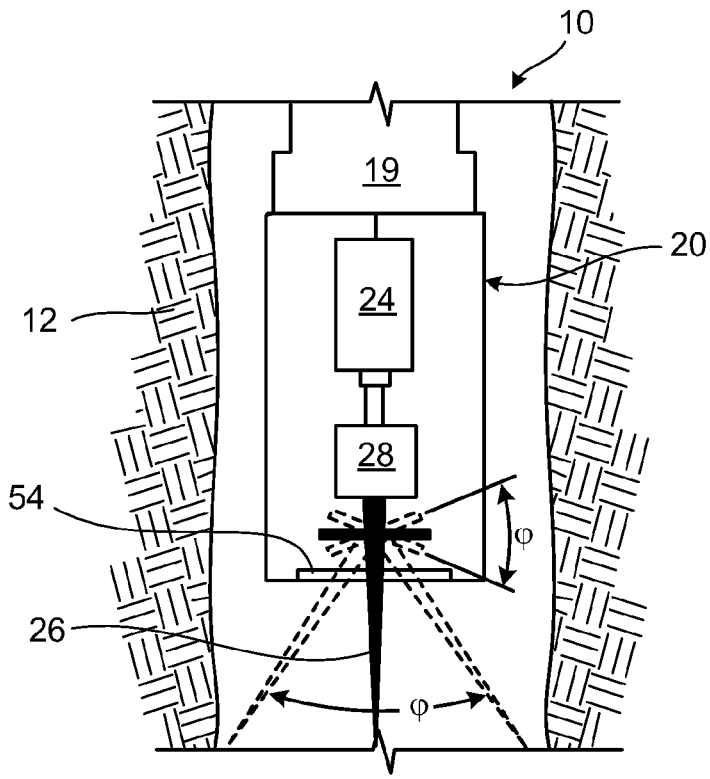
FIG. 6C is a cross-sectional view of an alternate illustrative laser tool showing different trajectories of the laser beam typical in drilling a vertical wellbore.

In the illustrative example of FIGS. 2 and 3, the laser beam 26 is directed using the reflector 30 and control servo 32, rather than or in combination with moving the laser tool 20. The control servo 32 can be configured to move the reflector 30, at least one of, about a longitudinal axis of the wellbore 10 (see FIG. 6A), about a transverse axis of the wellbore 10 (see FIG. 6B), or along at least one of the longitudinal and transverse axis of the wellbore 10. FIG. 6A depicts the laser tool 20 firing the laser beam 26 through angle α about the wellbore longitudinal axis. Depending on the application, it may be desirable to configure the laser tool 20 so that angle α may be as much as 360°. FIG. 6B depicts the laser tool 20 firing the laser beam 26 through angle β about the wellbore transverse axis. Depending on the application, it may be desirable to configure the laser tool 20 so that angle β may be as much as 360°. The laser tool 20 can be appropriately configured so as not to fire the laser beam 26 upon itself. FIG. 6C depicts an illustrative laser tool 20 firing in multiple trajectories, through angle φ, typical for drilling a vertical wellbore 10. Depending on the application, angle φ may be as much as 360° and may be oriented through 360° polar about the longitudinal axis of the laser tool 20.

Figure 6D:
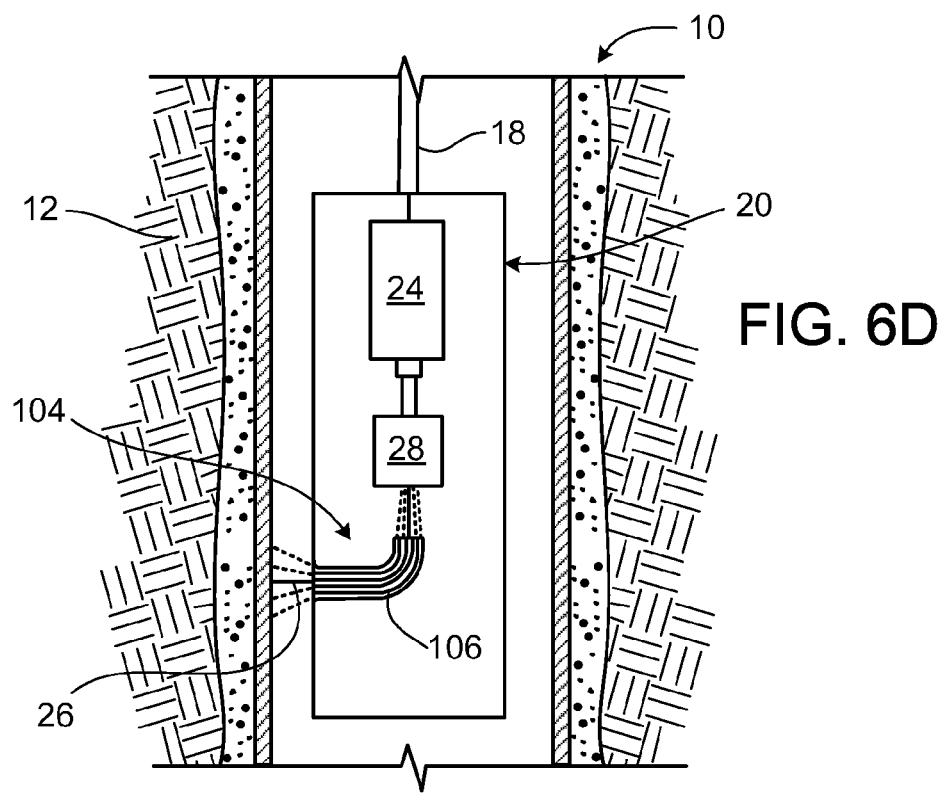
FIG. 6D is a cross-section view of another alternate illustrative laser tool showing different trajectories of the laser beam achieved using a fiber optic array.

FIG. 6D depicts a illustrative laser tool 20 that uses a light path 104 comprised of multiple optical fibers 106 each oriented to fire in a different trajectory. The laser beam 26 may be directed through all of the multiple optical fibers 106 substantially simultaneously, or may be multiplexed through the multiple optical fibers 106, for example, as a function of duty cycle as is described below. Likewise, emitted light can be received through the multiple optical fibers 106 for use in material analysis as is described herein. Although depicted with a specified number of optical fibers 106 arranged vertically, the number and pattern of the optical fibers 106 can vary. For example, only one optical fiber 106 can be provided. In another example, the pattern in which the optical fibers 106 are arranged can additionally or alternatively extend circumferentially about the laser tool 20 to reach circumferential positions about the wellbore 10. The arrangement of optical fibers 106 can be configured to produce specified patterns in the material removed, heated, and/or analyzed.

By directing the laser beam 26 relative to the laser tool 20, with reflector 30, light path 104, or otherwise, the laser tool 20 can remain in a single position (without further adjustments or reorientation) and remove or heat material in multiple locations around the wellbore 10. Accordingly, the number of adjustments and/or orientations of the laser tool 20 during an entire operation is reduced. Physically moving the laser tool 20 is time-consuming relative to adjustment of the laser trajectory using the configurations described herein (ex. by moving reflector 30). Therefore, the ability to reach multiple trajectories without moving the laser tool 20 reduces the amount of time necessary to perform operations (drilling, perforating, formation analysis, stimulating).

According to the concepts described herein, the laser beam 26 can be manipulated with multiple degrees of freedom and focal points to remove material in many different patterns. For example, standard geophysical investigation techniques can be used in characterizing a subterranean formation to observe formation characteristics such as permeability, principle directions of stress, the size distribution of particles in the formation, and/or formation fracturing characteristics.

The orientation and/or shape of the aperture(s) in the wall of a wellbore can be selected based on characteristics of the subterranean formation.

The orientation of the aperture(s) can be selected with an alignment to provide greater exposure of the aperture(s) and/or induced fracture(s) initiated at the aperture(s) to an axis of preferred permeability. So for example, a slice or thin wedge can be removed from the wall of the wellbore 10, orthogonal to and along the length of the wellbore 10, and orthogonal to a formation bedding plane, with a larger thickness at its distal end from the wellbore 10, and exposing far more formation surface than traditional perforating operations.

Aperture shapes and orientations can be selected based on the location of natural fractures in the formation. For example, apertures can be formed connecting to a pre-existing natural fracture identified while characterizing the formation. In some cases, an orientation of the apertures can be selected to facilitate formation of a fracture that connects with a natural fracture. The laser can be used to form apertures at a locations selected for fracture initiation. In some cases, the orientation of the apertures can be selected with an orientation aligned relative to direction of principal stress in the formation. The orientation of the apertures can be parallel to, orthogonal to, or at a specific angle relative to the direction of principal stress in the formation. The shapes of the apertures can have a maximum dimension that is aligned relative to a principal stress field of the formation. Selecting the aperture shape can include selecting an aperture shape with a longer axis aligned to expose more of the producing formation than a circular cross-section hole of a similar perimeter.

The distribution of sizes of particles in the subterranean formation can also be an used in selecting the shape and size of apertures being formed in a wellbore. For example, in a sandy formation, aperture shapes can be selected as slots with a slot size chosen such the slots being formed in a well casing filter particles from fluid in the formation. Larger apertures may be selected in a coal seam where the casing is used to prevent formation collapse rather than to filter out fine particles from fluid being produced from the formation.

The concepts described herein enable a perforation hole to be shaped (such as by providing slots, rather than tubes or pits) to minimize fluid pressure down-draw. Multiple shapes can be envisioned within the implementations which may promote hydrocarbon recovery rate, total recovery and efficiency.

In the illustrative laser tool 20, the laser beam 26 can be directed to remove or heat material circumferentially about the wellbore 10 by actuating the control servo 32 to rotate the reflector 30 about a longitudinal axis of the wellbore 10 and/or actuating the reflector 30 to move along the transverse axis of the wellbore 10. The laser beam 26 can be directed to remove or heat material along the axis of the wellbore 10 by actuating the control servo 32 to rotate the reflector 30 about a transverse axis of the wellbore 10 or move along the longitudinal axis of the wellbore 10. The laser beam 26 can be directed to remove or heat material in an area that is larger than could be removed in a single trajectory, by actuating the reflector 30 to rotate about and/or translate along at least two axes, for example the longitudinal and transverse axis. The laser beam 26 would then be directed in two or more different trajectories to substantially adjacent locations on the material being heated or removed. For example, by directing the laser beam 26 to project on the material being removed or heated at quadrants of a circle, the laser beam 26 can substantially remove or heat the material in a circular shape. By directing the laser beam 26 in two or more trajectories at the same location, the laser tool 20 can remove material to form a conical perforation having a largest diameter at the opening or having a smallest diameter at the opening. Also, the laser beam 26 may be directed in one or more trajectories to form a perforation in the earth formation, and concurrently while forming the perforation or subsequently, be directed in one or more trajectories to widen the perforation. The laser beam 26 can also be directed in two or more different trajectories to remove or heat material of the earth formation in a substantially continuous area or two or more disparate areas.

The laser being directable can be also be use to drill more efficiently and/or with unique hole characteristics, as compared to both the classic drill-bit drilling and prior non-directable laser drilling. In drilling with the laser beam 26, the laser beam 26 would be directed axially rather than radially, and the laser beam tool 20 would be conveyed on the bottom of the bottom hole assembly in place of the drilling bit (see FIG. 6C). A circular path could be swept by the laser beam 26, cutting (for example by spalling) a thin annular hole, approximately equal to a desired hole diameter. The resulting "core" sticking up in the middle would be periodically broken off and reverse circulated up the wellbore 10, for example up the middle of the drill string 19, to the surface. Accordingly, the laser energy is being used only to cut a small amount of rock (i.e. the annular hole). The same laser beam 26 directing configurations discussed above in the context of perforating could be applied to drilling. Because the material removal is not resulting from a mechanical bit being rotated, a circular cross-section hole is not necessary. For example, the laser beam 26 could be directed to sweep out elliptical, square, or other hole shapes of interest.

Using the directionality of the material removal allows formation of specified perforation section shape(s) that can provide enhanced production. For example, the perforations can be formed in a rectangular, oval, elliptical, or other hole section with a longer axis aligned to expose more of the producing formation than a circular cross-section hole, or aligned to provide greater exposure to an axis of preferred permeability, or preferential production (or non-production) of oil, water, gas, or sand. In another example, aperture geometry can be selected based on a distribution of sizes of particles in the subterranean formation to filter solids from fluid in the formation, the aperture geometry. Solids can range in size. The solids can be large pieces such as discrete chunks fractured from the body of a coal seam and small particles such as sand and formation fines. In some instances, the cross-section of individual openings in the casing can decrease with increasing distance from a central axis of the casing such that the smallest portion of each opening is at the outer surface of the casing. In unconsolidated formations, the aperture geometry and distribution can be selected to maintain structural stability of the unconsolidated formation.

Such specified perforation section shape(s) may provide wellbore or perforation stability. For example, a rectangular, oval, or elliptical shape can be employed with a longer axis aligned with the principal stress field of the formation, for increased stability and reduced tendency of collapse as compared to a circular cross-section hole. Moreover, if the formation rock is stable, the openings may be cut deeply into the formation, thus creating negative skin (enhanced flow potential) and enhancing formation fluid production or fluid injection.

In some well designs, evenly distributed openings arranged around the circumference of the wellbore can be formed by either removing all casing material for some width or by leaving some casing material in place. These openings can be repeated across the height of the formation or along the length of the wellbore if the wellbore is not vertical. This scenario works very well for a formation that is fairly isotropic with no immediate plan to use hydraulic fracture stimulation.

If the formation is to be hydraulically fractured, the openings could be created in a desired direction with respect to formation rock stresses, such as in the direction of the maximum stress. The openings can be sized to allow the desired flow of proppant laden fluid (unrestricted, or with a specific desired degree of slurry flow restriction). Using lasers to etch deep into the formation can significantly lower the pressure required for formation breakdown and also can lower the fracture propagation pressure.

If the formation is known to be anisotropic or naturally fractured, the location of the openings may be designed to take advantage of the formation properties or specific geomechanics present. For example, stress anisotropy is defined as a condition existing in a formation where there is a higher stress in one direction. In rock mechanics, these stresses are given three dimensions—x-y referring to the horizontal directions at 90 degrees orientation and the z direction in the vertical orientation.

For a conventional perforated well, $$Pb=3\sigma h-\sigma H+\text{Tensile strength of the rock}$$

where Pb is the breakdown pressure (i.e., the pressure necessary to initiate a fracture in rock by applying hydraulic force; σh is the minimum horizontal stress; and σH is the maximum horizontal stress. For a laser perforation with a perforation tunnel length of six times the wellbore radius $$Pb=\sigma h+\text{Tensile strength of the rock}$$

For a laser slotted perforation configuration, where the effective area of the perforation tunnel is increased substantially with a six inch penetration into the rock and a six inch vertical penetration:

$$Pb=\sigma h+\text{Tensile strength of the rock}$$

Thus, laser perforations in general can result in a lower pressure necessary to initiate a facture in rock by increasing the area of rock exposed to the hydraulic force such that the hydraulic pressure X perforation area equals the force applied to the rock to initiate the fracture.

In addition, the ability to precisely locate perforations being formed by laser tools can make it easier to locate openings to coincide with the higher permeability areas of the formation. Since, for a laser perforation that is oriented in such a way to connect to an exposed pre-existing natural fracture as determined by logging information:

$$Pb=\sigma h$$

This can further reduce the pressure necessary to initiate a facture in rock. Various logging, seismic, and/or micro-seismic techniques such as, for example, triple combo logging based on a combination of resistivity, bulk density, and porosity measurements; magnetic resonance imaging; and dipole sonic logging can be used to locate exposed pre-existing natural fractures. The laser tool 20 is then positioned to form perforations accessing these natural fractures.

In wellbores that are not cased, or cased but have no annular fill for sealing material, laser cuts that penetrate the formation can create a "zone of weakness" at the selected location to enhance the probability that fracture initiation from a frac treatment would occur at the selected location(s), whereas conventional shape charge perforating methods may actually increase resistance to fracture initiation by the severe compaction of the formation material that occurs using that perforation process. Additionally, lasers can be used to create or fuse shut slotted liner sections "in-situ". Selective laser sintering of fusible powders may also be used to close slotted liner section 'in-situ". One advantage of doing this is that slotted liner sections can be created selectively after standard casing has been run and cased hole logs used to determine where liner slots should be placed. This would eliminate the need for intricate space-out of liner sections while deploying the liner.

In some instances, the general sequence of laser initiation of a stimulation/fracturing treatment proceeds as illustrated in FIGS. 7A-7J. A section of wellbore to be stimulated is illustrated in FIG. 7A. The downhole tool 214 including slips 216 and packer 218 is run in the hole on a jointed pipe (see FIG. 7B) before the laser tool 20 is run downhole on the cable and landed and sealed in the downhole tool (see FIG. 7C). Next, the slips 216 are set as shown in FIG. 7D. In some cases, the slips 216 of the downhole tool 214 can be set prior to running the laser tool 20. The laser light (denoted as the dotted arrows) is transmitted down the cable, collimated or focused, and directed toward the formation with a reflector 30 (see FIG. 7E). As described above with reference to FIG. 6A, the reflector 30 may be movable in order to control the direction of the beam.

Additionally, fluid can be pumped from the surface along the cable, through channels in the laser tool 20 and outward, coaxially with the laser energy. The stream of fluid can provide several advantages. First, the fluid can move debris and other materials removed by the laser away from the beam. Second, the fluid can help maintain a clear, low optical loss path between the laser tool 20 and the inner surface of the wellbore. Finally, the flow of fluids from the surface can cool the laser tool 20 and the cable.

In general, the fluid is chosen for its optical clarity so as to minimize the disruption of the focused laser beam. The efficiency of a fluid-based light path is a function of the optical transmission efficiency of the fluid. To increase the efficiency of the fluid-based light path, a fluid having a high optical transmission efficiency at the wavelength of the laser beam 26 or emitted light 36 can be selected. Water, certain oils, and mixtures or solutions including water and/or oil, are among many efficient optically transmissive fluids that can be used for the fluid-based light path. While water and oil are both liquids, the fluid need not be liquid. For example, the fluid-based light path could be a gas, such as nitrogen at high pressure. The absorptivity of the fluid for the laser and LIBS Spectrum wavelengths should be taken into account during the selection of the fluid used in the light path. In an embodiment, a gas such as nitrogen at high pressure may be used with a liquid to allow a clear path for the laser beam.

The density of the fluid, as well as the speed at which it is expelled from the laser tool 20, may be selected to reduce the influence of outside factors on the path of the fluid-based light path. For example, as the drilling mud circulates through the wellbore 10, it can entrain the fluid-based light path, and, in the case of a light path that is directed substantially perpendicular to the wall of the wellbore 10, shift the light path to impact the wall at an angle and at a different location that originally aimed. Likewise, impacts with larger particulate in the drilling mud may attenuate or deflect the light path from its trajectory. Such deflection and shift can be reduced by jetting the fluid at a high speed or even ultrasonic speed and/or by choosing a fluid that is dense. The density of the fluid, be it water, oil, or other, can be increased, if so desired, with a weighting agent, such as cesium salt, which can result in a mixture which has acceptable transparency. Additionally, the circulation of fluids through the wellbore 10 can be ceased during operation of the laser tool 20, or the laser tool 20 can be operated when circulation of fluids would otherwise be ceased, for example, while adding joints of pipe in the normal drilling process.

The influence of outside factors on the path of the fluid-based light path can also be reduced by reducing the distance the light path must span between the laser tool 20 and the material being removed or analyzed. The distance can be reduced by providing the outlet through which the fluid-based light path is expelled close to the material being removed or heated, for example, by selection of the laser tool 20 diameter to be close to the diameter of the wellbore 10 and/or provision of the outlet in a stabilizer fin. To the degree the fluid based light path does shift or deflect, if the light path remains continuous or any break in the light path is insignificant, the laser beam 26 or emitted light 36 will still follow the path and be transmitted between the material being removed or analyzed and the laser tool 20.

However, for subterranean wellbores, the medium within the wellbore provides functions such as, for example, well control, bit lubrication, pipe lubrication, sloughing control, cuttings transport and removal, temperature regulation, pressure regulation and other specialized functions. As optical clarity is not a typically requirement for wellbore media, a majority of traditional wellbore fluids (i.e., drilling muds) do not readily transmit light and are inappropriate for the downhole laser applications. However, other medium which normally have been used in specialized applications (both on surface and in the subsurface) are candidates for this application. Some fluids useful for this purpose include, for example, fresh water, inorganic salt brines, or soluble viscosifiers. Acids (e.g., acetic acid, hydrochloric acid, formic acid, citric acid or combinations thereof); gases (e.g., nitrogen, natural gas, and carbon dioxide), and oils (e.g., mineral oil, gasoline, xylene, and toluene) can also be used.

For example, some saltwaters including but not limited to sodium chloride, potassium chloride, ammonium chloride, calcium chloride, sodium bromide, calcium bromide, zinc bromide, potassium formate, and cesium formate saltwaters can have a level of light transmissibility that can permit the transmission of a laser beam in a subterranean environment. These saltwaters span the density range from 8.3 ppg to 22 ppg. The density range is important in that as the density of fluid impacts the hydrostatic pressure used for well control (i.e., to balance the subterranean pressure from the different strata). It can be advantageous use fresh water and some saltwaters because these fluids can be left in the wellbore and/or formation after use.

In another example, a variety of viscosifing agents can also provide a clear medium for transmission of light. Specific examples of agents that provide a clear medium for transmission of light include but are not limited to polysaccharide-hydroxyethyl cellulose (HEC) (commercially available as Halliburton Product WG-17), carboxymethyl hydroxypropyl guar (CMHPG) (commercially available as Halliburton Product WG-18), hydroxypropyl guar (HPG) (commercially available as Halliburton Product WG-11), biopolymers such as xanthan (commercially available as Halliburton Product WG-24, WG-37, and BP-10) and diutan, and derivatized HEC (commercially available as Halliburton Product WG-33). Examples of agents that, properly prepared and/or filtered can provide a clear medium for transmission of light include but are not limited to Terpolymer (commercially available as Halliburton Product FDP-S906-08) and guar gum (commercially available as Halliburton Product WG-11, WG-19, WG-22, WG-26, WG-31, WG-35, WG-36). In some embodiments, the fluid may absorb the laser energy and vaporize to provide a clear path for the laser beam. Vaporization of the liquid along the laser beam path may assist in removal of debris and cuttings from the actions of the laser. Minimizing the fluid path length of the laser beam, for example, by extendable devices may be advantageous in the use of liquid fluids to remove debris and cuttings.

The viscosifing agents can suspend and "sweep" away residual drill cuttings which could otherwise block the transmission of the laser beam. These agents can also increase the viscosity of the fluid in the wellbore which can help limit the loss of fluid (leak off) to the formation and can help to maintain a constant and consistent subterranean environment. In addition, because most of these fluids can be used with a variety of saltwaters, they can provide a wide range of densities which make them more useful for well control applications.

Carbon Dioxide is a gas at standard temperatures and pressures. When it reaches its super critical state (87.9° F. (31.1° C.) and 1070.6 psia (7.38 mpa)), carbon dioxide acts as both a liquid and a gas and, as a colorless liquid, can have good light transmission properties.

Acids are often used in subterranean environments for their abilities to dissolve and remove unwanted materials or objects. Acids which can have sufficient light transmissivity to be used with downhole laser tools include but are not limited to HCl, HF, acetic, citric, and formic Acids. Acid solutions can also provide a reactive medium to assist in the operation of the laser to produce the desired material removal effects.

Certain petroleum distillates can provide a high level of optical clarity which would permit the operation and transmission of a laser beam. Petroleum distillates include but are not limited to xylenes, butanes, etholenes, tolulenes, propane, terpine and various other fluids. Certain products like propane would typically be gaseous but under pressure and temperature constraints can be made into a liquid. These liquids are often beneficial as solvents.

Laser tools 20 using fluid-based light paths are discussed in more detail in U.S. Pat. Pub. No. 2006/0102343.

After the laser has been on, an initial perforation 22 is made as shown in FIG. 7E. In order to extend the perforation 22, the hydraulic system in the downhole tool 214 moves the laser tool 20 vertically relative to the stationary slips 216 at a controlled rate. This motion while the laser is on extends the perforation 22 into a slot as shown in FIG. 7F.

At this point, it may be possible to reposition the downhole tool 214 without removing the laser tool 20 and repeat the steps shown in FIGS. 7D-7F to make multiple slots without withdrawing the laser tool 20 to the surface. However, if the downhole tool 214 is run on jointed pipe, one will only be able to move the downhole tool 214 with the laser tool 20 in place the length of the pipe joint. If joints need to be added or removed from the string, the laser tool 20 will need to be retrieved to surface before adding or removing joints and run back in to continue cutting.

The laser tool 20 can be withdrawn to the surface (see FIG. 7G) before the packers 218 are set (see FIG. 7H), and the stimulation treatment commenced (see FIG. 7I). In some cases, the packer(s) 218 will not be required for stimulation and the downhole tool may be removed and the stimulation treatment pumped from the surface.

Referring to FIGS. 8A-8C, in some embodiments, the downhole tool 214 and laser tool 20 are combined on the end of coiled tubing such that one can make multiple cuts over a wide range of depths by repeatedly performing the illustrated steps and repositioning the coiled tubing between iterations. After the perforations are formed, the coiled tubing can be removed and the stimulation treatment can be pumped downhole. Alternatively, the coiled tubing can be left in place and the treatment pumped downhole outside of the coiled tubing. Additionally, the addition of a bypass valve in the coiled tubing string that routes stimulation fluids around the laser tool (e.g., routing flow from the bore of the coiled tubing into the annulus and/or otherwise bypassing the laser tool) can allow one to pump the stimulation fluids through the coiled tubing with the downhole tool 214 and laser tool 20 and cable in place. Thus, in some instances, hydraulic fracturing operations conducted on multiple interval completions can take advantage of laser perforating deployed with coiled tubing or wireline to conduct the fracturing operations sequentially without the need to trip in and out of the wellbore between treatments to perform the perforating operations.

If the laser tool 20 is mounted on the end of a coiled tubing unit, it can be run in the well and the laser and purge fluid can impinge on a fixed location to effect a simple, round perforation. The laser tool 20 can be rotated in the well bore if desired to make multiple round, azimuthally distributed perforations at a single depth. The coiled tubing mounted laser tool 20 can then be repositioned to perforate at a different depth. Simple laser perforating can be accomplished with the cable conveyed laser tool 20 and downhole tool.

In another application, laser tools can be used to activate setting and releasing mechanisms in downhole tools apart from or together with weight, tension, or explosives. The tools can be conveyed into position by wireline or jointed or coiled tubing and then set in place by using a downhole laser tool. For example, a downhole laser can be used to heat fluid in a sealed chamber to provide hydraulic force necessary to activate the setting or unsetting mechanism in the tool. In another example, a downhole laser can be used to cut an element to release stored energy provided by a spring mechanism within the tool. Similarly, the same technique can be used to provide a release mechanism for retrieving these tools. Use of these techniques to set and/or release tools provides operations that do not require explosives or specially run tubulars. In addition, if sensitive tools (such as pressure gauges, fluid sensors, etc.) need to be placed precisely in a wellbore, the use of laser activated tools provides a 'softer' set mechanism as well as compatibility with other wireline tool components that provide depth correlation and telemetry for data retrieval.

In some embodiments, a laser can be generated at the surface and conveyed through a fiber-optic cable (e.g., as part of an electric wireline cable) to a pressure vessel attached to a downhole tool. The laser can be used to heat fluid in the pressure vessel to provide hydraulic force capable of shifting a tool to a set or unset position for the purpose of setting or retrieving the tool with wireline.

Figures 9A, 9B:
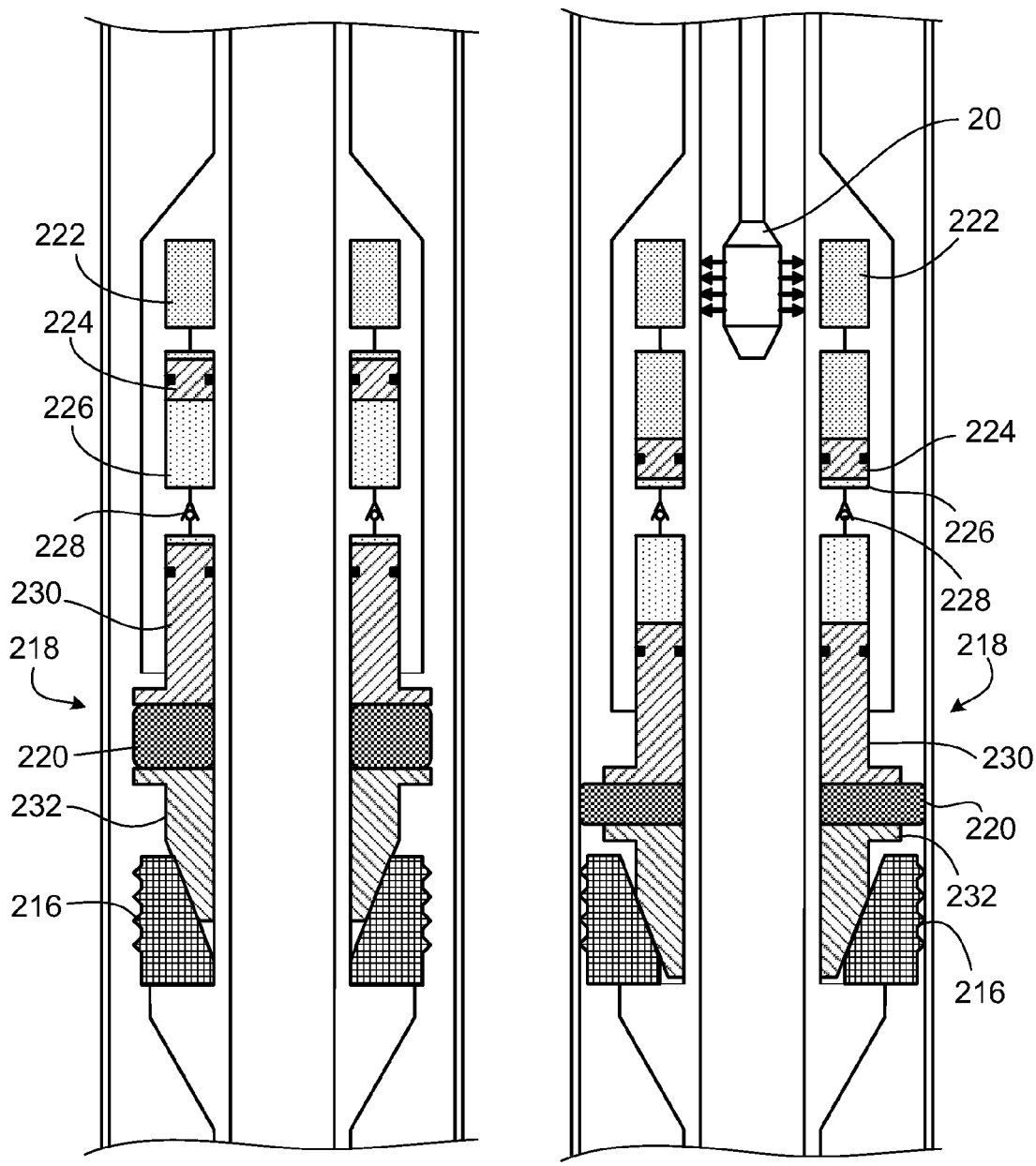
FIGS. 9A and 9B are schematics of a laser set packer.

FIGS. 9A and 9B illustrate use of this technique to set a packer 218. The packer 218 is run into the well with the slips 216 and sealing elements 220 retracted. Once the packer 218 is located at the desired depth, a laser tool 20 is lower into the well to a position adjacent to a fluid filled chamber 222 in the packer tool. The fluid in the chamber 222 expands and exhibits increased pressure when heated sufficiently. The laser beam heats the fluid in the chamber caused fluid expansion and increased volume. The pressure is transferred through a floating piston 224 to another chamber 226 which contains a hydraulic oil. The hydraulic oil passes through a check valve 228 and acts upon a hydraulic ram 230 which compresses a sealing element 220. The sealing element 220 transfers the axial load to the slip loading ram 232 which drives the slips 216 out against the casing. The packer remains set because the check valve 228 prevents the hydraulic oil from flowing back into the oil chamber 226 once the laser beam is removed an the expansive fluid cools down. This concept can be used with any tool which required actuation downhole. For example, other common tools that can be set or released using this technique include, for example, bridge plugs, and anchors for sensors such as pressure, rate, temperature, micro-seismic, and/or tilt-meters; 'kick-off' plugs, oriented re-entry ports for multi-laterals, and baffles.

In some embodiments, the laser can be used in conjunction with settable tools to cut elements within the tool to release springs or other resilient members that would provide the stored energy to activate the setting mechanism and disengage the wireline from the set tools. Alternatively, when tools require retrieval the laser can cut through a retaining mechanism within the tool that would allow removal of the tool with wireline.

Figures 10A, 10B:
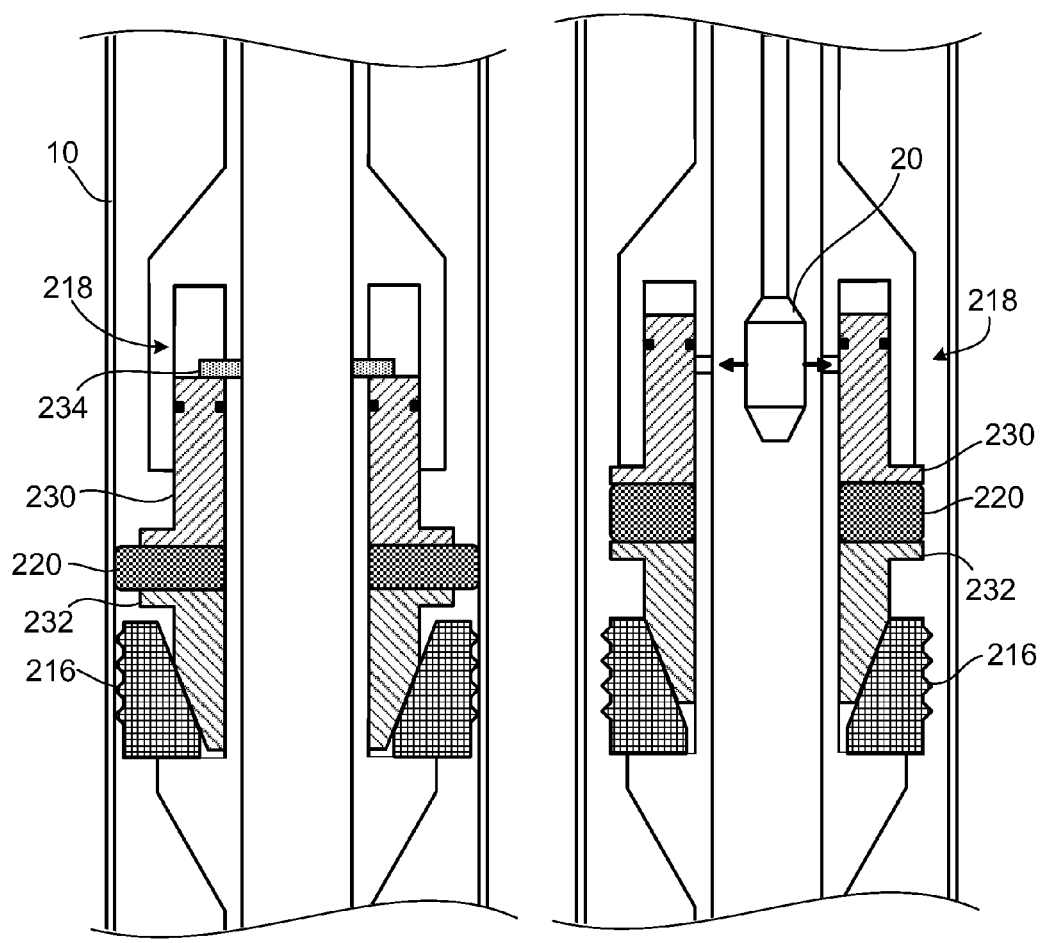
FIGS. 10A and 10B are schematics of a laser released packer.

FIGS. 10A and 10B show a laser released packer. In this embodiment, a mechanical element which maintains the integrity of the packer set is removed with a laser thus causing the packer to become unset. A laser tool is lowered into the wellbore until it is properly aligned with the release element 234 within the packer. The release element holds the mechanical load placed on the setting mandrel 230 during setting of the packer 218. This load is carried by the setting mandrel 230, the sealing element 220, the slip ram 232, and the slips 216 which "bite" into the casing. The laser beam is then turned on and the release elements 234 are removed causing the mechanical load on the packer to be relieved, thus allowing the packer to un-set. This type of release mechanism can be used on any tool which has a secondary position which is held in place by a mechanical element. This same method can be used to initiate a set or other downhole tool movement by releasing a spring or opening a hydraulic path which causes a change in position in a downhole tool.

In another application, downhole lasers can be used to glaze or resurface surfaces downhole. In some instances, the glazing can be performed after extended periods of hydrocarbon production.

For example, in some instances, the production flow stream contains solids that pit or erode a surface (e.g., a surface of a downhole tool). If the chemical nature of the flow constituents is unknown or not properly planned for, the flow-wetted surfaces may begin to deteriorate very quickly due to incompatibility between the flow constituents and the type of metallurgy used to make the downhole hardware. Being able to glaze/resurface the necessary downhole devices in place can save considerable expense (work-over rig costs and non-producing time) and get the wells to return to production more quickly.

Certain wells require stimulation to produce at economic rates. The stimulation treatments can be performed at any time during the life of the well. It is not uncommon for wells to receive multiple stimulations over the course of a number of years. The fluids and components of the stimulation systems can be erosive, corrosive, or both. Downhole laser tools can be used to perform downhole glazing to repair damage created from the stimulation fluids placed into the wellbore and/or damage that may have occurred when the remnants of the stimulation fluids flow back through the flow-wetted parts of the downhole installation.

Laser glazing of metal surfaces is a process in which the surface of a metal is heated by laser irradiation. As the laser beam passes over the surface, a micro-surface layer of the metal can be melted. Once the laser beam moves, the melted micro surface layer can quickly re-solidify into a thin surface coating. This surface coating hardens the surface and may remove stress cracking (e.g., stress cracking that may be involved in the initiation of metal failure). In addition, the surface of a metal that has been treated by laser glazing often has a lower coefficient of friction than the original untreated surface.

Using downhole laser glazing can provide a hardened, smoothed, and more lubricious metal surface and, performed in a downhole environment, has a number of advantageous applications. For example, the laser glazing of the metal surfaces adjacent to/in proximity to lateral wellbores from a vertical wellbore (i.e., the "bend" or "heel" section of a deviated or lateral wellbore) provides advantages in horizontal drilling, completions, or work-over operations. In particular, multi-lateral drilling and completion operations may be enhanced by metal surface treatments that provide results achievable by laser glazing; especially following an operation such as milling a window in casing. Additionally, such laser glazing may also enhance metal resistance to corrosion.

In subterranean wellbores, horizontal drilling and horizontal completions sometimes require lateral milling through the casing of a wellbore to allow the subsequent drilling and completion of a lateral from that wellbore. For example, this may occur in cases where the primary wellbore is vertical, inclined, or horizontal in nature. In a typical window milling operation, a casing whipstock is set and used to guide a casing milling tool. After the casing milling operations are complete, the milling tools are removed and, in some cases, a drilling whipstock can then be placed for guidance of the drilling operation through the milled window. In the drilling of the lateral, the initial angle of deviation is typically on the order of 5 to 10 degrees. However, even with these small angles of deviation, drilling collars may rub and wear on the casing sections above the milled window and hardening of this area can reduce wear. Thus, it is desirable that material at the junction is relatively soft for easier milling operations. Subsequently hardening and smoothing this area can reduce wear during subsequent drilling and completion operations when the milled window is being utilized.

Figure 11C:
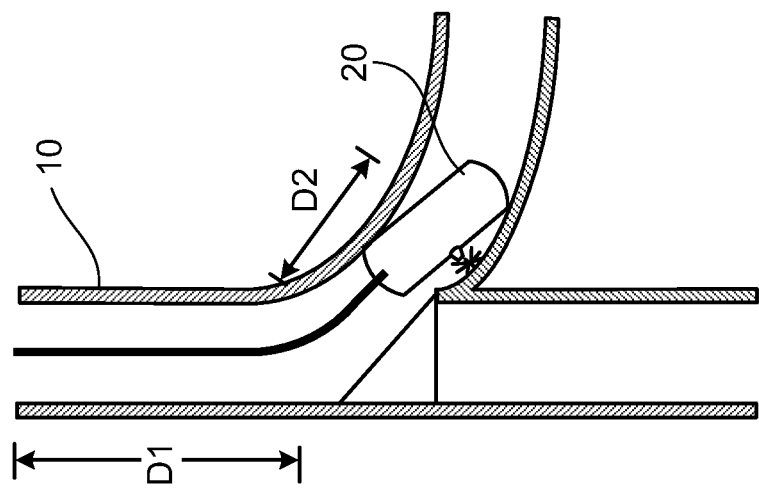
FIGS. 11A-11C is a series of schematic side views illustrating a downhole laser-glazing process.
Figure 11B:
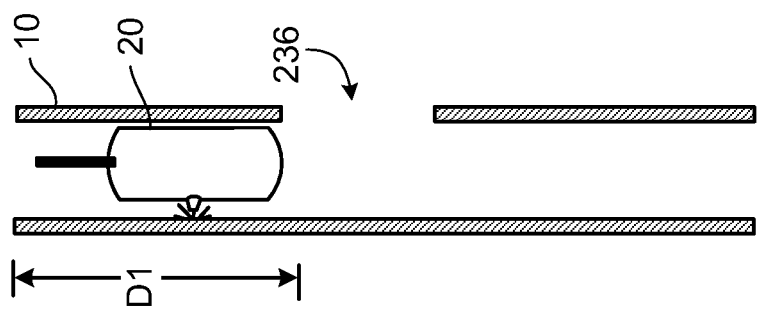
Figure 11A:
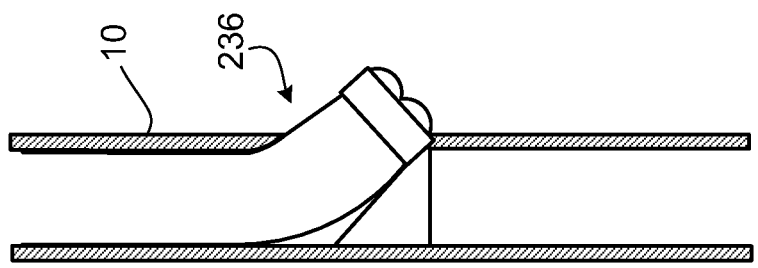

Referring to FIGS. 11A-11C, laser glazing can be used in lateral milling, drilling, and completion operations. For example, as shown in FIG. 11A, a window can be milled through the casing of a wellbore 10. Although illustrated as a vertical wellbore, the wellbore 10 can be inclined or horizontal in nature. After window 236 has been milled through the casing of the wellbore 10, a downhole laser tool 20 can be used to glaze interior surfaces of the casing of the well bore for a distance D1 above the window 236 as shown in FIG. 11B. The downhole laser can be deployed on wireline or (coiled and/or jointed) tubing. The distance D1 can be approximately 100 feet (e.g., more than 25 feet, more than 50 feet, more than 75 feet, less than 200 feet, less than 150 feet, and/or less than 125 feet). The downhole laser tool 20 can then be withdrawn from the well bore 10 and lateral well bore drilled through the window 236. The downhole laser tool 20 can then be deployed into the lateral well bore to glaze a casing of the lateral well bore for a distance D2. The distance D2 can be approximately 20 feet (e.g., more than 5 feet, more than 10 feet, more than 15 feet, less than 50 feet, less than 40 feet, and/or less than 30 feet). Laser glazing of the casing about 100 feet above the junction and glazing of the lateral stinger provides hardened surfaces with reduced wear and friction such that lateral drilling and completion operations are enhanced.

Referring to FIG. 11B, laser-formed coatings such as ceramic, polymer, metal, or other coatings may be applied to the inner surfaces of the casing for distance D1 wherein D1 can be approximately 100 feet (e.g., more than 25 feet, more than 50 feet, more than 75 feet, less than 200 feet, less than 150 feet, and/or less than 125 feet). Referring to FIG. 11C, laser-formed coatings such as ceramic, polymer, metal, or other coatings by be applied to the inner surfaces of the casing for distance D2 wherein D2 can be approximately 20 feet (e.g., more than 5 feet, more than 10 feet, more than 15 feet, less than 50 feet, less than 40 feet, and/or less than 30 feet). Such laser-formed coating may be applied by selective laser sintering of fusible-powders.

Figure 14:
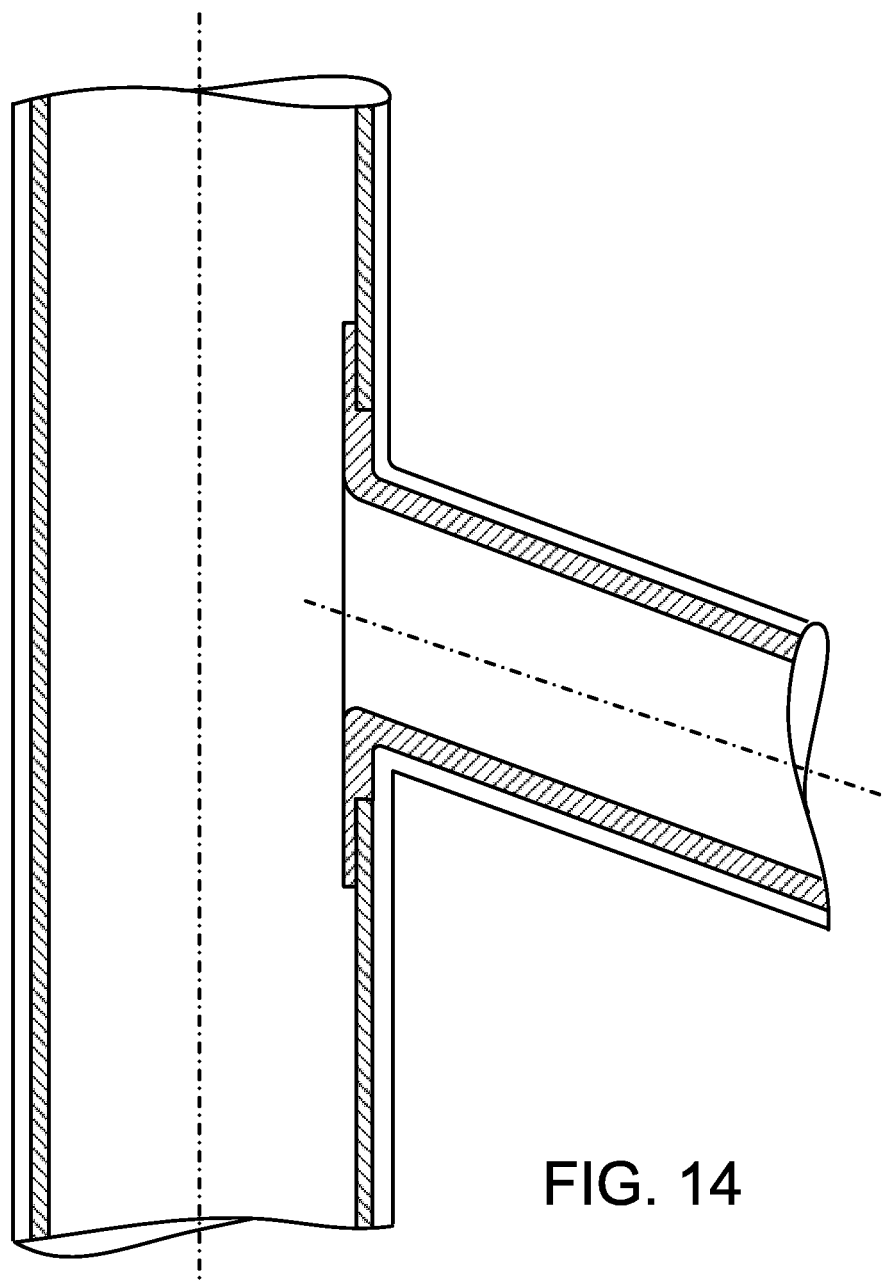
FIG. 14 is a schematic of a junction in a wellbore.

In some instances, the laser tool can be used to form the window extending through a casing installed in a wellbore. After the window is formed, a piece of downhole equipment can be inserted into the wellbore; and engaged to the window. For example, the laser can be used to form a window sized to receive a junction. The junction is then deployed into the wellbore such that the junction is aligned with the window; and inserted into and extending through the window. The window can be sealed after the junction is inserted into and extending through the window. FIG. 14 illustrates a junction inserted in a window formed in a casing in a wellbore.

Typically subterranean wellbores are designed to be functional for multiple years and decades. The wellbore hardware is constructed based on the anticipated future flow of fluids (e.g., oil and water), gas (e.g., natural gas), and occasionally solids (e.g., sand and/or formation materials). However, should there be a significant change to the flow constituents, the flow nature and characteristics may exceed the original design parameters of the downhole hardware. Examples of production changes that can negatively impact downhole hardware include: increasing solids content leading to increasing erosion and pitting; the introduction of sulfide reducing bacteria (SRB) into the reservoir which can turn the product sour and cause the steel of the hardware to crack; and increasing water flow creating scale deposition. When this occurs, the normal process has been to mobilize a rig, attempt to remove the existing downhole hardware and replace it with more appropriate hardware This process can be a very expensive series of operations. There is a significant risk that well will not be able to return to the same level of production after the replacement is complete. In addition, the removal of the existing downhole hardware may be very difficult and time consuming, and it may not be possible to physically remove the hardware. Downhole laser glazing can be used to change the surface characteristics of the flow-wetted downhole hardware (e.g., production packers, mandrels, gas lift mandrels, sand control screens, control valves, sliding sleeves, and production tubing) to provide new characteristics intended to be more appropriate to the new flow regime.

Normal well operations such as setting packers and perforating can also cause surface damage and increased susceptibility to corrosion and erosion in high wear areas within a well casing. Each time a packer or other downhole tool is "set" in the casing, biting action of the slips can damage the casing. The same sections of a casing (e.g., a section near a perforation through the casing) are often used repeatedly for setting packers and/or other downhole tools. In time, such high-use sections of the casing become very worn and damaged. Laser glazing can be used to enhance these high-wear/high-use areas and/or to smooth and repair these areas.

In addition, selective laser sintering of fusible-powders (metal, ceramic, polymer, or fusible powders) can be used to modify, build-up, or repair the surfaces of downhold hardware and/or casing.

Additionally, laser glazing/treatment following perforation of casing can smooth and harden the surface of the perforated casing and holes to reduce erosion and corrosion in the areas damaged during perforation.

Laser glazing operations can provide improvements to a metal surface such as hardening of the metal surface, smoothing the metal surface, decreasing the friction coefficient of the surface, and increasing corrosion resistance of the metal surface. Laser glazing, particularly in downhole applications, can provide much higher efficiency than chemical treatments used to try and achieve at least some of the same effects. As noted above, for downhole oilfield operations, the metal surface improvements provided by laser glazing may enhance multi-lateral milling, drilling, and completion operations. In addition, production equipment may be more cost effectively treated to allow continued production without equipment replacement.

Downhole laser operations can also be used in combination with downhole video and/or thermal imaging camera observation of the laser operations. For example, downhole lasers and video can be used in combination to remove impediments to downhole tools. A laser generated at the surface can be conveyed downhole to a moveable targeting device through a fiber optic cable embedded into a electric line cable. The same cable can also include a fiber optic cable for the purpose of providing downhole video capability with a camera at the end of the cable in juxtaposition to the laser targeting device. Thus, the operator would have surface control of laser cutting at a remote, downhole location. In regions where video camera images may be impeded, thermal imaging cameras may be used to guide laser operations. Thermal imaging sensors may also be used in combination with video cameras to evaluate laser cutting or welding operations to assist in control of the laser beam (power, direction, and other laser operational parameters.

Downhole laser tools and operations can also be used to control the degree of communication from the wellbore to the formation (e.g., a downhole laser tool can be used to remove and/or consolidate formation material downhole). For example, a laser may be used downhole to remove and/or consolidate formation material. The laser can have variable power levels to achieve varying effects. The laser might be used to consolidate the wellbore to enhance borehole stability and, in effect, make an in-situ casing. A low power setting might be used to perforate a subterranean formation and then a high power setting might be used to consolidate the interior of the perforation tunnel. Varying power settings, durations, and sequences can be used to vary the properties of the consolidated rock from completely impermeable to very permeable. Other combinations of power, duration, sequences, and transmission materials can be used to change the structure of the consolidated formation in the range from vitrified to crystalline.

Materials might be used downhole prior to, during, or after the laser treatment to further modify or enhance the properties of the consolidated rock such as strength or permeability. For example, a filter cake may be created by pressure pumping below fracturing rates. When exposed to the laser, the filter cake can be solidified to enhance the mechanical strength of the rock. In another example, a material (e.g., a fusible ceramic particulate) can be added to a liquid transmission medium which would interact with the consolidation process such that the permeability of the consolidated rock was changed. This consolidation process can reduce the amount of fines produced over time. As the same laser can be used to form perforations in the formation, both perforation and formation treatment can be performed in one downhole trip instead of the multiple trips for perforation and formation treatment required today.

In another downhole application on of laser technology, lasers can be used to initiate explosives, including explosives of explosive-based perforating guns for perforating wellbore casings and/or subterranean formations. Traditionally, wireline conveyed explosives are electrically initiated. This mature technology is susceptible to EM and other radio or electrical interference which may cause the explosives to fire prematurely, sometimes with catastrophic results.

Figure 12:
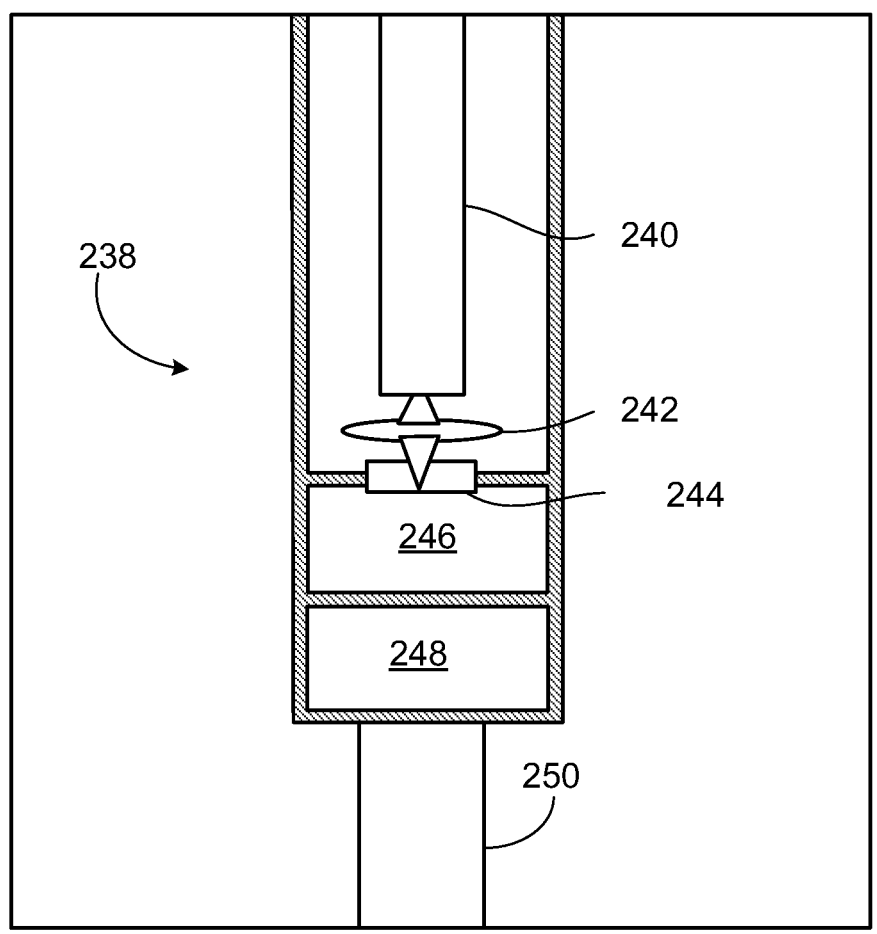
FIG. 12 is a schematic view of a laser-initiated detonation.

Referring to FIG. 12, a laser detonator includes an optical fiber 240 in the logging cable. This fiber 240 is capable of transmitting fairly large amounts of laser power. Light exiting the end of the fiber is focused through a conventional lens 242 or alternatively, a curved mirror through a transmissive window 244 to heat a small volume of temperature sensitive material 246 such as, for example, titanium subhydride potassium perchlorate (THKP). Heating of the THKP causes the detonation of an adjacent volume of an explosive 248 such as, for example, high melting explosive (HMX) which is used to initiate detonating cord 250 connected to a conventional explosive train to fire the perforating guns.

Since a laser is used to detonate the explosives, there is no possibility of electrical interference of any sort. Only firing of the laser will detonate the explosives. No radio silence or other restrictions on the use of electrical equipment during operations are required. This can provide increased safety for personnel onsite as well as reduced chances of accidentally perforating out of zone due to electrical interference. The elimination of electrical interference opens the possibility of combining adding electric conductors to the fiber in the wireline cable so that one can run logging tools during perforating runs. This may enable a savings in rig time due to the ability of combining logging and perforating in a single run.

In some embodiments, a laser can be used to ignite a explosive propellant for the wireline setting of packers and bridge plugs. For example, the HMX in FIG. 12 can be replaced with a propellant that activates a wireline setting tool such as, for example, a Baker 20 wireline tool. This can be significantly quicker than heating up a fluid to pressure set a tool as described with respect to FIGS. 9A and 9B.

In another downhole application on of laser technology, laser tools can be used to adjust the flow parameters of a well that has been in production. For example, fluids can be communicated through a first aperture in a wall of the wellbore. The fluids can be pressure fluids being used to frac a formation, fluids being produced from a subterranean formation through the wellbore, and/or fluids such as steam being introduced into the subterranean formation from the wellbore.

After communicating fluids through the first aperture in the wall of the wellbore, a laser can be used to seal the first aperture in the wall of the wellbore. In some instances, the wall of the wellbore includes a casing and the laser is used to seal an aperture in the casing. The aperture can be sealed by fusing shut apertures in the casing (e.g., by heating the casing such that opposite sides of the aperture fuse together) or by selectively laser sintering fusible powders (e.g., fusible powders disposed in the aperture). In some instances, the wall of the wellbore is an open hole and using a laser to seal an aperture in the wall of the wellbore includes sealing an aperture in side surfaces of the open hole (e.g., by glazing the surface of hole extending into a subterranean formation to reduce the local permeability of the formation in the vicinity of the hole). The laser can also be used to form a second aperture in the wall of the wellbore which can be used, for example, to producing fluids from the subterranean formation.

This approach can be applied to heavy oil formations in which it is desirable to reduce the viscosity of oil in a subterranean formation. Steam can be introduced into the subterranean formation through first apertures in the wall of a wellbore. A laser tool can then be used to seal the first apertures. The laser tool can then be used to open other apertures in the wall of the wellbore. These second apertures can be formed, for example, at locations spaced apart from the locations where the first apertures were previously found. Alternatively or additionally, these second apertures can be formed at the same location where the first apertures were previously found but with a different geometry (e.g., shape and/or distribution) than the first apertures.

This approach can also be used to adjust the production profile of a well. For example, a well can having an existing production profile and a specified production profile. If the existing production profile does not match specified production profile, location information on apertures selected to achieve the specified production profile can be received. A laser tool can be run into a wellbore of the well and operated to change a flow distribution of the wellbore to cause the existing production profile to more closely match the specified production profile. Operating the laser tool to change the flow distribution of the wellbore can include forming apertures in the wellbore using the laser and/or sealing apertures in the wellbore using the laser.

For example, in response to the upcoming of underlying water near the heel of a horizontal well, apertures near the heel of the substantially horizontal wellbore can be sealed and additional apertures can be formed at the far end of the horizontal wellbore. Thus, the laser tool can be used to change the distribution of apertures along a substantially horizontal wellbore to balance flow along the substantially horizontal wellbore.

In another example, after producing fluids from one subterranean zone, apertures can be formed to access a second subterranean zone. In some instances, the apertures providing fluid communication from the first subterranean zone to the wellbore can be sealed.

In another downhole application on of laser technology, laser tools can be used in the installation of downhole equipment in a wellbore. The laser can be used to form a profile (e.g., a female profile) in a wall of the wellbore. A piece of downhole equipment (e.g., a seal, a pump, liner hanger, or a downhole steam generator) can be inserted into the wellbore and the profile formed in the wall of the wellbore can be engaged with the piece of downhole equipment.

The female profile in the wall of the wellbore can be a recess in a casing installed in the wellbore (e.g., a recess that only extends partway through the casing). The female profile can be sized and positioned to receive extendable dogs on the piece of downhole equipment. The female profile can include an annular recess extending around an inner diameter of the casing or multiple discrete recesses formed at a common distance from an entrance of the wellbore to set the location of the piece of downhole equipment along the wellbore. In some instances, the female profile includes a keyway or multiple keyways to limit the rotation of the piece of downhole equipment after it is set in place with the extendable dogs on the piece of downhole equipment are aligned with and extended to matingly engage the recesses in the surfaces of the wellbore.

Figure 13A:
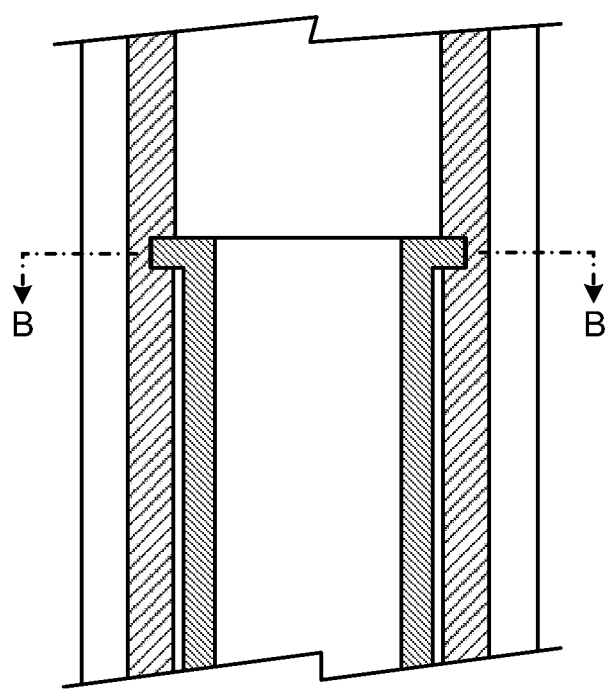
FIGS. 13A and 13B are, respectively, an axial cross-sectional schematic and a transverse cross-sectional schematic of a liner hanger in a wellbore.
Figure 13B:
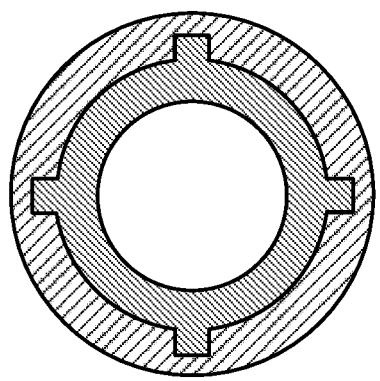

FIGS. 13A and 13B are schematics illustrating the use of a female profile comprising multiple discrete recesses to suspend a liner hanger in a wellbore. Although shown as vertical, the wellbore could have other orientations (e.g., be slanted or horizontal). The recesses extend only partway through a casing in the wellbore. Four equally spaced dogs are extended to engage the recesses to hold the liner hanger in place. Other numbers of recesses and dogs can be used in other embodiments of the system.

Various configurations of the disclosed systems, devices, and methods are available and are not meant to be limited only to the configurations disclosed in this specification. Even though numerous characteristics and advantages have been set forth in the foregoing description together with details of illustrative implementations, the disclosure is illustrative only and changes may be made within the principle of the invention. Accordingly, other embodiments are within the scope of the following claims.

What is claimed is:

1. A method comprising:
selecting an aperture geometry and aperture size to filter solids from fluid from a subterranean zone, the aperture geometry and aperture size each selected based on a distribution of sizes of particles in the subterranean zone;
using a laser to form slots with the selected aperture geometry and aperture size in a casing installed in a well in the subterranean zone; and
in response to levels of particles in fluid from the well, operating the laser to change a flow distribution of the well, wherein operating the laser to change the flow distribution of the well comprises sealing apertures in a wellbore wall using the laser.

2. The method of claim 1, wherein selecting the aperture geometry and aperture size to filter solids from the subterranean zone comprises selecting the aperture geometry to filter particles from fluid from the subterranean zone.

3. The method of claim 2, wherein selecting the aperture geometry and aperture size to filter particles from fluid from the subterranean zone comprises selecting the aperture geometry and aperture size to control sand production including formation fines.

4. The method of claim 1, wherein selecting the aperture geometry to filter particles from fluid from the subterranean zone comprises selecting the aperture geometry in which the cross-section of individual apertures in the casing decrease with increasing distance from a central axis of the casing such that a smallest portion of each aperture is at the outer surface of the casing.

5. The method of claim 1, wherein the subterranean zone comprises an unconsolidated formation and selecting the aperture geometry to filter solids from fluid from the subterranean zone comprises selecting the aperture geometry to maintain structural stability of the unconsolidated formation.

6. The method of claim 1, wherein operating the laser to change the flow distribution of the well comprises forming apertures in a wellbore wall using the laser.

7. A method comprising:
selecting an aperture geometry and aperture size to filter solids from fluid from a subterranean zone, the aperture geometry and aperture size each selected based on a distribution of sizes of particles in the subterranean zone;
using a laser to form slots with the selected aperture geometry and aperture size in a casing installed in a well in the subterranean zone;
in response to levels of particles in fluid from the well, operating the laser to change a flow distribution of the well; and
sealing first apertures extending through the casing and forming second apertures extending through the casing of the well, the second apertures having a different geometry than the first apertures.

8. The method of claim 7, wherein a width of the second apertures is smaller than a width of the first apertures.

9. The method of claim 1, wherein using a laser to form slots with the selected aperture geometry and aperture size in a casing installed in the well in the subterranean zone is performed while forming the well in the subterranean zone.

10. The method of claim 1, further comprising producing fluid from the subterranean zone through the well.

11. The method of claim 10, further comprising, in response to levels of particles in fluid being produced through the well, operating the laser to change a flow distribution of the well.

12. A method, the method comprising:
selecting an aperture geometry to filter solids from fluid from a subterranean zone, the aperture geometry selected based on a distribution of sizes of particles in the fluid from the subterranean zone;
using a laser to form slots with the selected aperture geometry in a casing installed in a well in the subterranean zone; and
in response to levels of particles in fluid from the well, sealing apertures in a wellbore wall using the laser to change a flow distribution of the well.

13. A method, the method comprising:
selecting an aperture geometry to filter solids from fluid from a subterranean zone, the aperture geometry selected based on a distribution of sizes of particles in the fluid from the subterranean zone;
using a laser to form slots with the selected aperture geometry in a casing installed in a well in the subterranean zone; and
sealing first apertures extending through the casing and forming second apertures extending through the casing of the well, the second apertures having a different geometry than the first apertures.

14. The method of claim 13, wherein a width of the second apertures is smaller than a width of the first apertures.

* * * * *